United States Patent
Barton et al.

(10) Patent No.: US 8,907,754 B2
(45) Date of Patent: Dec. 9, 2014

(54) VARIABLE FIELD MAGNETIC HOLDING SYSTEM

(71) Applicant: DocMagnet, Inc., Raleigh, NC (US)

(72) Inventors: Simon Charles Barton, Raleigh, NC (US); Michael Tony Gaunce, Durham, NC (US); William Carter Orr, III, Raleigh, NC (US)

(73) Assignee: DocMagnet, Inc., Raleigh, NC (US)

( * ) Notice: Subject to any disclaimer, the term of this patent is extended or adjusted under 35 U.S.C. 154(b) by 0 days.

(21) Appl. No.: 13/775,843

(22) Filed: Feb. 25, 2013

(65) Prior Publication Data
US 2014/0049347 A1 Feb. 20, 2014

Related U.S. Application Data

(60) Provisional application No. 61/683,853, filed on Aug. 16, 2012.

(51) Int. Cl.
| | |
|---|---|
| *H01F 7/20* | (2006.01) |
| *B23Q 3/15* | (2006.01) |
| *B25B 11/00* | (2006.01) |
| *B23Q 3/154* | (2006.01) |

(52) U.S. Cl.
CPC ............. *B23Q 3/15* (2013.01); *B25B 11/002* (2013.01); *B23Q 3/1543* (2013.01)
USPC ............................ 335/290; 269/8; 335/295

(58) Field of Classification Search
CPC ........ B25B 11/002; B23Q 3/15; B23Q 3/154; B23Q 3/1543; B23Q 3/156; H01F 2007/208; H01F 7/04; H01F 7/0257; H01F 7/0273
USPC .......................... 335/302, 306, 285–290, 295; 310/12.01; 296/8
See application file for complete search history.

(56) References Cited

U.S. PATENT DOCUMENTS

| | | |
|---|---|---|
| 3,316,514 A | 4/1967 | Radus |
| 4,090,162 A | 5/1978 | Cardone |

(Continued)

FOREIGN PATENT DOCUMENTS

| | | |
|---|---|---|
| JP | H08-324951 A | 12/1996 |
| JP | 2004-18200 A | 1/2004 |

(Continued)

OTHER PUBLICATIONS

PCT Search Report for WO2014/028448 dated Nov. 13, 2013.

*Primary Examiner* — Bernard Rojas
(74) *Attorney, Agent, or Firm* — Miller Patent Services; Jerry A. Miller

(57) ABSTRACT

A magnetic holding device uses an array of switchable magnets. A carrier holds the array of switchable magnets to form a working surface. Each switchable magnet has a coil of wire surrounding a magnetizable core element. The array is arranged in groups of magnets. A circuit is coupled to the coils to selectively magnetize and demagnetize each group of switchable magnets to selectively independently place each group into one of these states: an ON state that configures the selected group to have a first magnetic polarity at the working surface, an ON state that configures the selected group to have an opposite magnetic polarity at the working surface, and an OFF state that configures the magnets in the selected group to have no magnetism at the working surface. This abstract is not to be considered limiting, since other embodiments may deviate from the features described in this abstract.

24 Claims, 21 Drawing Sheets

(56) References Cited

U.S. PATENT DOCUMENTS

| | | | | |
|---|---|---|---|---|
| 4,215,330 A | * | 7/1980 | Hartman | ........................ 335/306 |
| 4,356,467 A | | 10/1982 | Cardone | |
| 4,507,635 A | | 3/1985 | Cardone | |
| 4,777,463 A | | 10/1988 | Cory | |
| 4,847,582 A | * | 7/1989 | Cardone et al. | ............... 335/289 |
| 4,956,625 A | | 9/1990 | Cardone | |
| 5,041,806 A | | 8/1991 | Enderle | |
| 5,270,678 A | | 12/1993 | Gambut | |
| 5,402,021 A | * | 3/1995 | Johnson | ..................... 310/12.24 |
| 6,002,317 A | | 12/1999 | Pignataro | |
| 6,104,270 A | | 8/2000 | Elias | |
| 6,489,871 B1 | | 12/2002 | Barton | |
| 7,610,861 B1 | * | 11/2009 | Colclasure | ..................... 104/292 |
| 8,031,038 B2 | | 10/2011 | Kimura | |
| 2010/0013583 A1 | | 1/2010 | Kimura | |
| 2012/0256715 A1 | * | 10/2012 | Fullerton et al. | ............... 335/285 |

FOREIGN PATENT DOCUMENTS

| | | |
|---|---|---|
| JP | 2005-206337 A | 8/2005 |
| WO | 2014/028448 A1 | 2/2014 |

\* cited by examiner

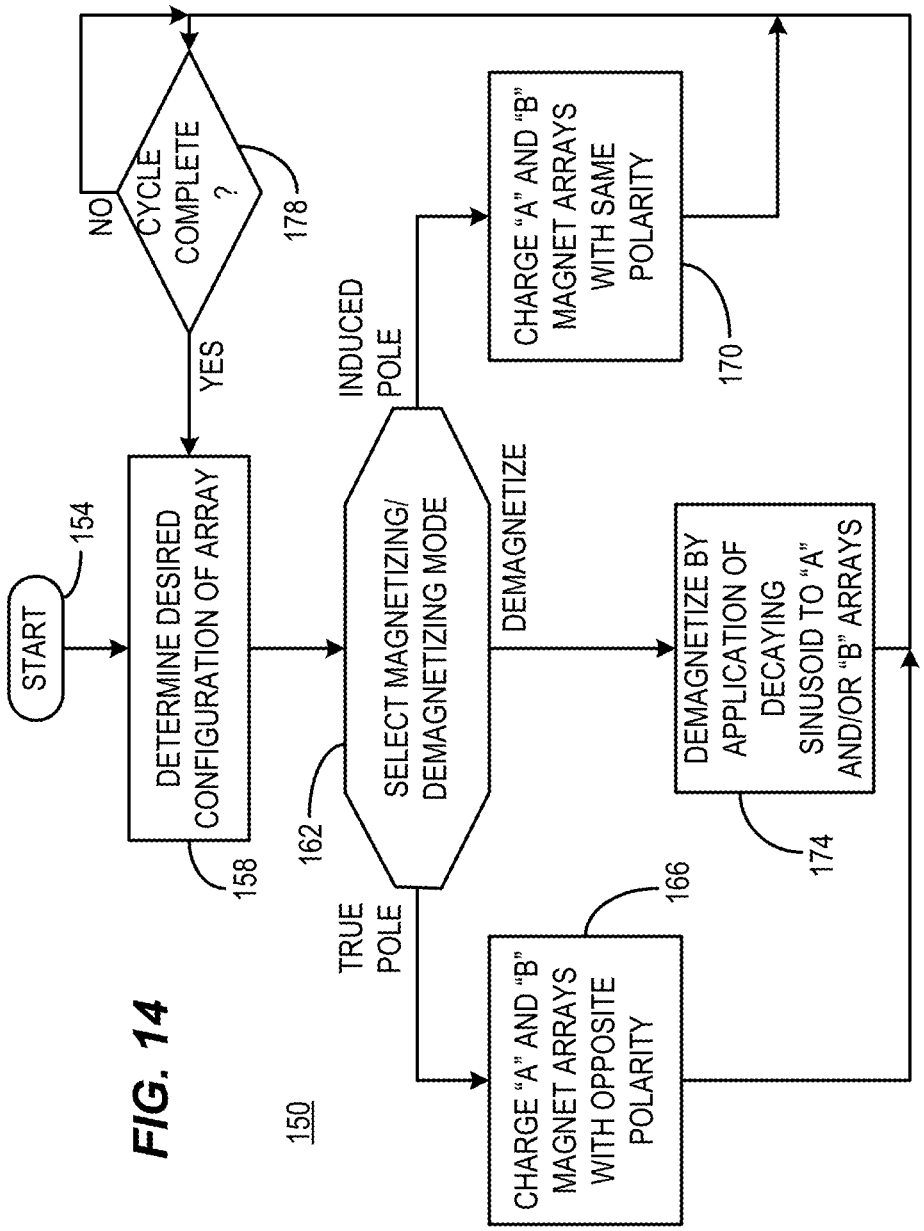

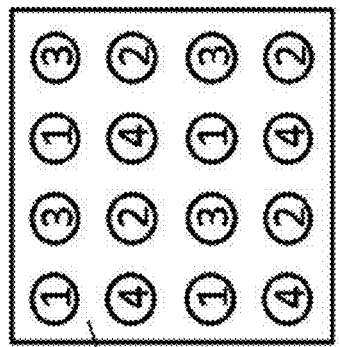
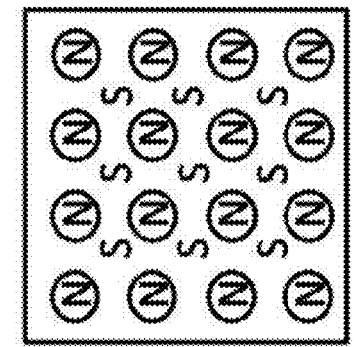
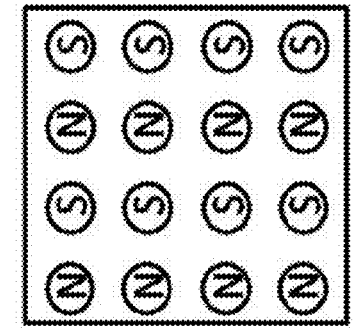
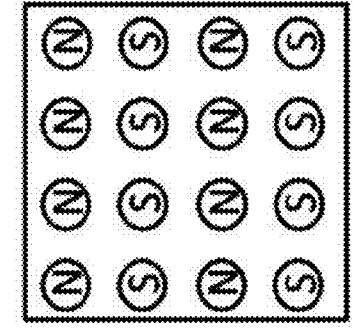
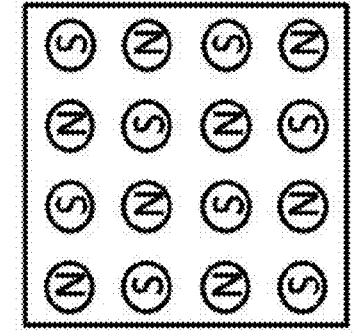
FIG. 19

VARIABLE FIELD MAGNETIC HOLDING SYSTEM

CROSS REFERENCE TO RELATED DOCUMENTS

This application claims priority benefit of U.S. Provisional Patent Application No. 61/683,853 to Barton, et al. filed Aug. 16, 2012 which is hereby incorporated by reference. U.S. Pat. No. 6,489,871 is hereby incorporated by reference.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

There are many conflicting design constraints when designing magnetic workpiece manipulation devices (generally referred to herein as magnetic holding systems) such as clamps, holding system, lifters, handles and chucks. The job to be carried out and the end product along with safety concerns often dictate design constraints. Usually, it is the case that a particular design is quite application specific, so if a job changes somewhat, it is usually the case that a new design of the magnetic holding system is needed.

Consider, for example, a switchable magnetic lifter system that is designed to lift large sheets of steel that are one inch thick from a stack. It is generally desired to obtain maximum flux in the magnetic lifter system and if it is designed to lift 1 inch sheets of steel it may be permissible to allow the majority of the flux lines passing through the steel sheets to extend to a depth in the steel sheets of about one inch. However, if one wishes to repurpose this magnetic lift system to pick up steel sheets that are only 3/16 or 1/4 inch thick, it is possible and likely that if the same magnetic lift system is used without modification two or more of the steel sheets will be lifted at once. Not only is this likely to be unsuitable for the intended purpose, but also is a potential safety hazard.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which:

FIG. 11 is a plan view of the switchable magnet and poles in an array of FIG. 8 configured as a true pole system in a manner consistent with certain embodiments of the present invention.

FIG. 14 is a flow chart depicting an example of a process for magnetizing and demagnetizing the magnetic system in a manner consistent with certain embodiments of the present invention.

FIG. 19 depicts four examples of a four circuit system for configuring magnets in a manner consistent with certain embodiments of the present invention.

FIG. 22 shows a true pole configuration while FIG. 23 shows an induced pole configuration.

DETAILED DESCRIPTION

Figure 1:
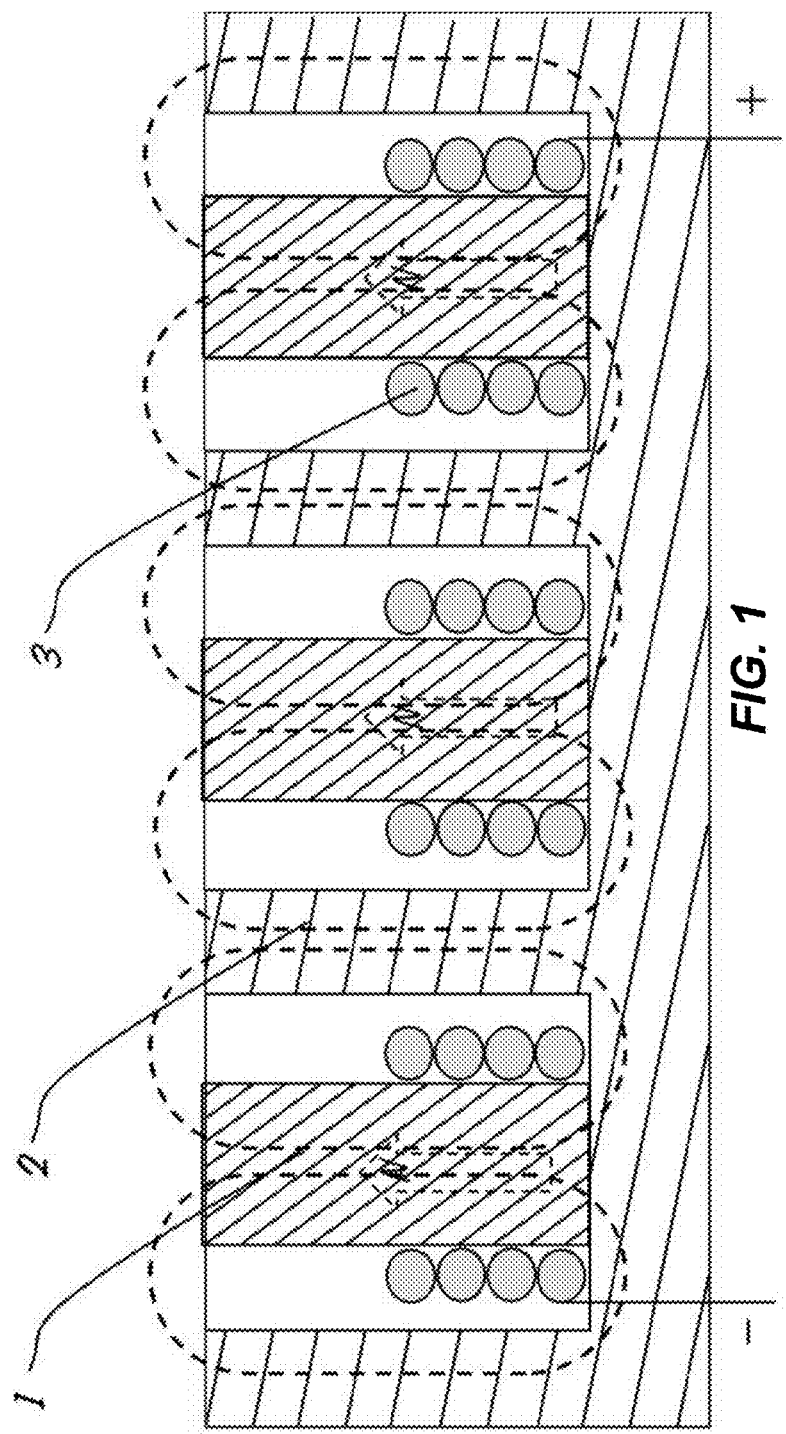
FIG. 1 depicts a switchable magnetic array using electromagnets.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a script, a program module, a shared library/dynamic load library and/or other sequence of instructions designed for execution on a computer system.

Reference throughout this document to "one embodiment", "certain embodiments", "an embodiment", "an implementation", an "example" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For purposes of the present document, the following terms are defined:

Permanent Electromagnets are magnets that utilize both permanent magnet and electromagnet technologies in a single assembly to form a magnetic circuit. Such magnets assemblies are sometimes referred to as electro-permanent magnets. A permanent-electro magnetic device uses the supply of direct current around a coil surrounding a group of permanent magnets which are contained within a ferromagnetic pole design within the device. This electromagnetic force is only used momentarily to magnetize the permanent magnets. The direction of the current around the coil determines the polarity of the permanent magnet. Once magnetized, the permanent magnets retain their state and orientation until an alternative electromagnetic pulse is provided to the coils.

Metal magnets are magnets made from metals and metal alloys (e.g., ALNICO—aluminum-nickel-cobalt—or chromium-cobalt).

Ferrite magnets are magnets made from ferrite materials such as ceramics.

Rare earth magnets are magnets made using rare earth elements such as Neodymium.

An induced pole system has a magnet or an array of magnets mounted within a metallic ferromagnetic base, carrier or mount that serves as a conductor of magnetic flux in which in the case of an array, the array of magnets are all oriented to have their poles face the same direction such that flux flows through the carrier to complete a magnetic circuit so that the carrier serves as an induced opposing pole. An induced pole system using circular magnets is shown in U.S. Pat. No. 6,489,871 which is hereby incorporated by reference.

A true pole system is an array of magnets mounted within a mount, base or carrier in which the array of magnets is arranged such that certain of the magnet's neighboring magnets in the array are oriented with opposite polarity. In such an array, most of the magnetic flux in the magnetic circuit flows from magnet to magnet through the workpiece with relatively little flowing through the carrier at the surface of the workpiece.

A magnetic holding system is any system that uses magnets to hold a workpiece in place such as a clamp, a lifter or a chuck. A high coercivity magnet is a magnet which is difficult to demagnetize. A low coercivity magnet is a magnet that is less difficult to demagnetize. These are relative terms, but generally, metal magnets are categorized as low coercivity magnets and Ferrite and rare earth magnets are categorized as high coercivity magnets. For the sake of a numerical guide only, low coercivity magnets used as the switchable magnet in a permanent-electro magnetic device have a coercive force (Hc) value in the region of approximately 45 kA/m (565 Oersteds)-60 kA/m (753 Oersteds) [source: MMPA Standard 0100-00]. It will be appreciated that this range is to be considered an approximation, and one of ordinary skill in the art may be able to adapt magnets having coercivity outside this range to operate in a manner consistent with the present teachings under certain circumstances.

A switchable magnet is a magnet that can be switched on and off. For purposes of this document, the term "off" is not necessarily absolute since some small amount of residual magnetism can remain so long as it is significantly less than the that of the "on" state and ceases to hold or releases a workpiece, as will be understood by those skilled in the art.

A permanent electromagnet uses an electrical current (usually a short duration of current flow, e.g., commonly less than ½ second but ultimately subject to size) to switch the magnet on or off. The polarity of the magnet is dependent upon the direction of current flow through the electromagnet coils. When used as a clamp, lifter or chuck, the magnet should have a coercivity that permits the magnet to be magnetized at least long enough to effect the clamping, lifting or chucking function for which it is to be used, and it should further be readily de-magnetizable to effect the off state.

A working surface is a surface of a magnetic holding system which contacts a workpiece. The working surface can have either the magnets themselves or more commonly pole pieces associated with the magnets forming a portion thereof.

For purposes of this document, except when referred to separately a pole piece may be considered a part of a magnet.

A Magnetic chuck or Lifting Magnet is a switchable clamping device that enables the securing (and unclamping) of ferromagnetic materials through the manipulation of a magnetic field. A Magnetic Chuck is mainly used to secure the workpiece against machine forces as associated with metal cutting and metal forming disciplines such as grinding, milling, turning electro-discharge machining etc. A Lifting Magnet is mainly used to convey a load under a crane, for example.

Such devices when assembled are usually identified as having a plate or body of which the contact surface or working surface with the load or workpiece is made up of a series of poles of a specific geometry separated by non-magnetic spacers.

A magnetic field is generated either by internal permanent magnets or through an electromagnetic coil. This resulting field is then directed through the poles. In all cases, the workpiece or load acts as a "bridge" to allow magnetic flux to pass from one pole to another resulting in an attractive force anchoring the workpiece or load to the device.

The magnetic field can be activated/deactivated in 3 ways:

Electromagnetism: Referring to FIG. 1, electromagnets having ferromagnetic cores 1 and their surrounding coils 3 are placed within a mount, carrier, base, frame or body 2 internally within the magnetic circuit. Direct current passes through the coil 3 and a magnetic field is produced so long as electrical current is maintained. Simple disconnection of the current from the coils turns the magnet off.

Figure 2:
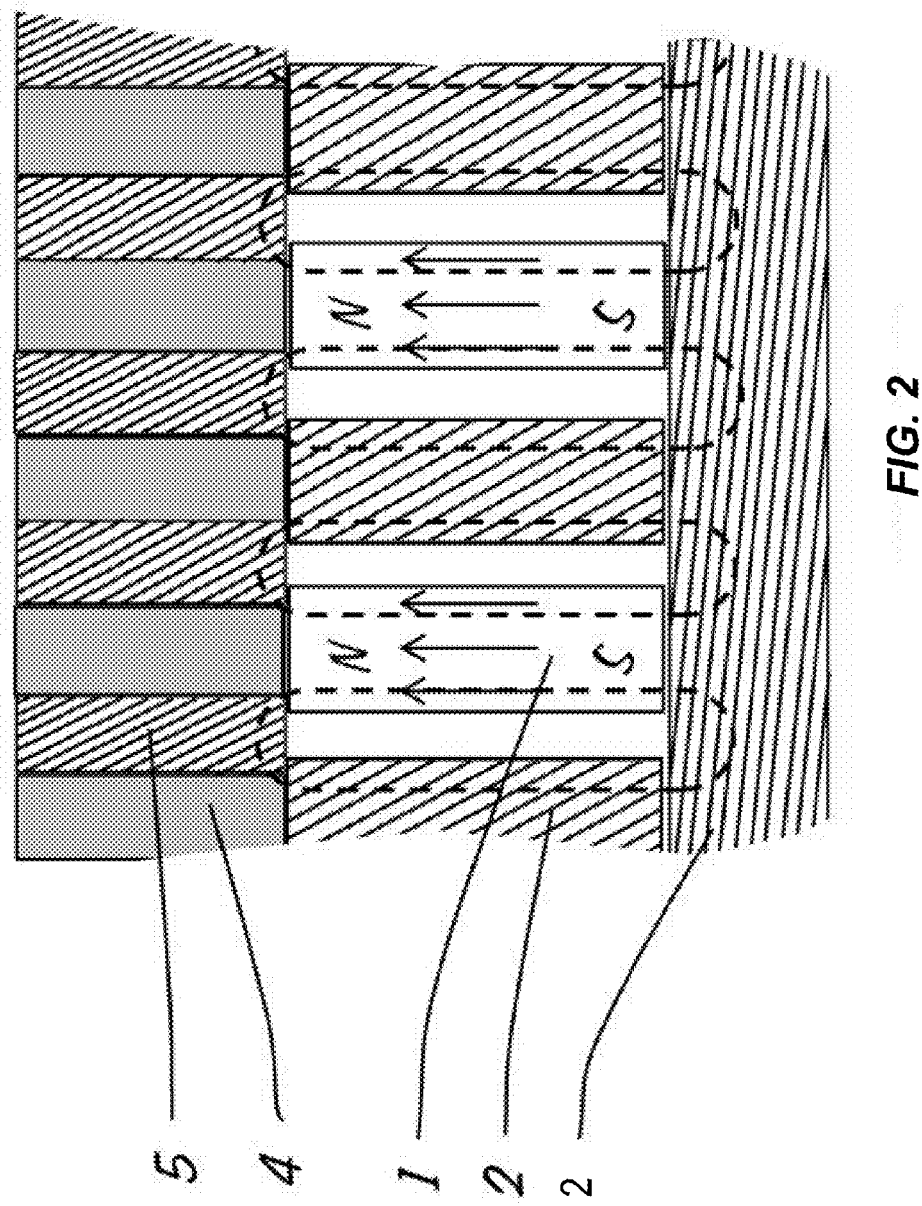
FIG. 2 depicts a switchable permanent magnet array in the OFF state.
Figure 3:
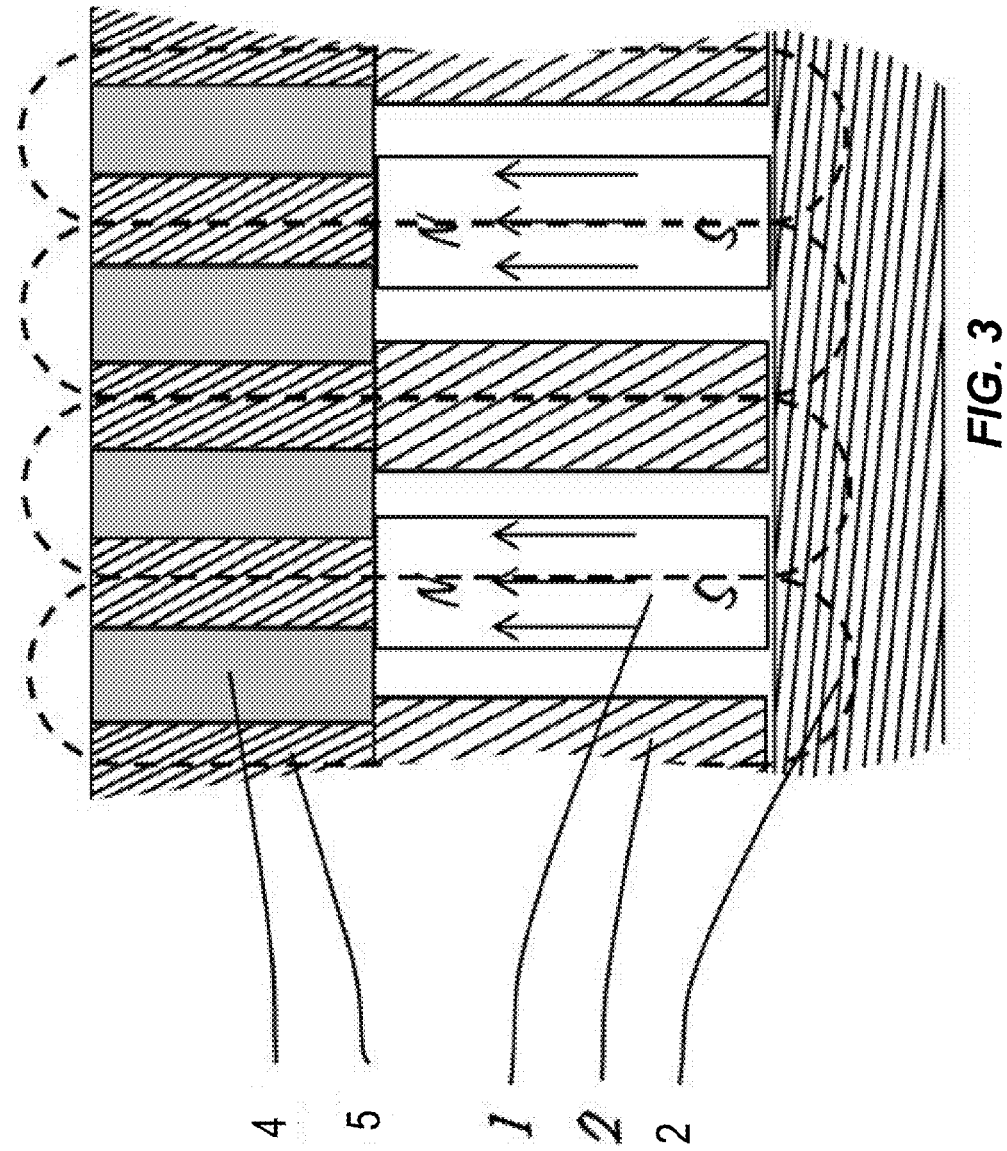
FIG. 3 depicts a switchable permanent magnet array in the ON state.

Permanent Magnetism: Referring to FIGS. 2 and 3, Internal permanent magnets 1 are incorporated into an assembly, sometimes called a "pack" or "frame" made up of magnetically conductive elements 2 that make up the body and through the mechanical alignment of this assembly in relation to the top poles 5, magnetic flux can be passed through the workpiece for clamping or the magnetic flux is redirected internally in the OFF condition as shown in FIG. 2. The ON condition is shown in FIG. 3 where top poles 5 are brought into alignment with the poles of the magnets so as to conduct flux to a workpiece (not shown). Non-magnetic spacers 4 are used for proper alignment of the arrangement in this example and to assist with magnetic flux manipulation. Further note that in the examples of FIG. 2 and FIG. 3, the carrier or body is made of separate side and bottom elements both labeled as 2.

Figure 4:
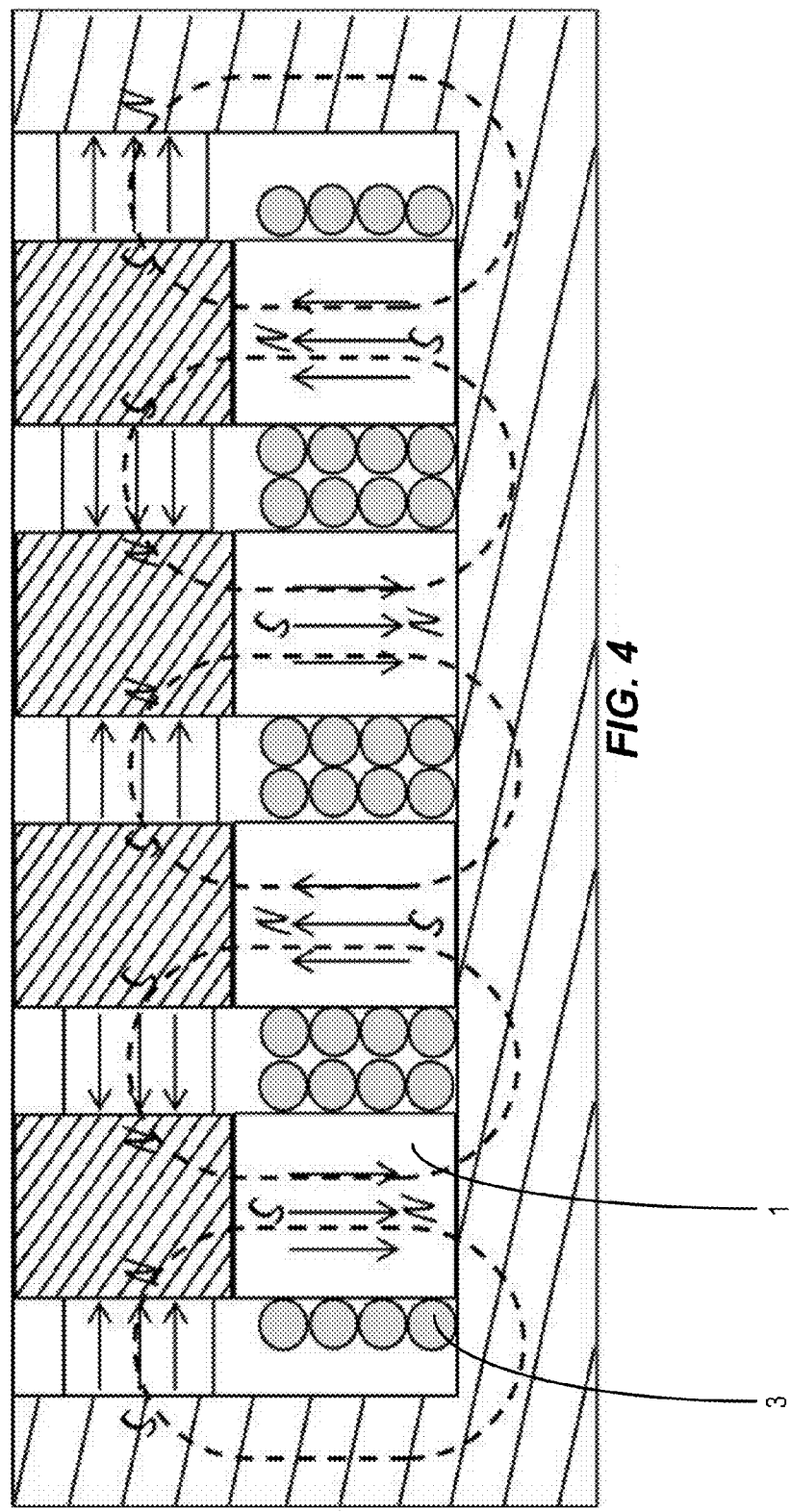
FIG. 4 depicts a permanent electromagnet array in the OFF state.
Figure 5:
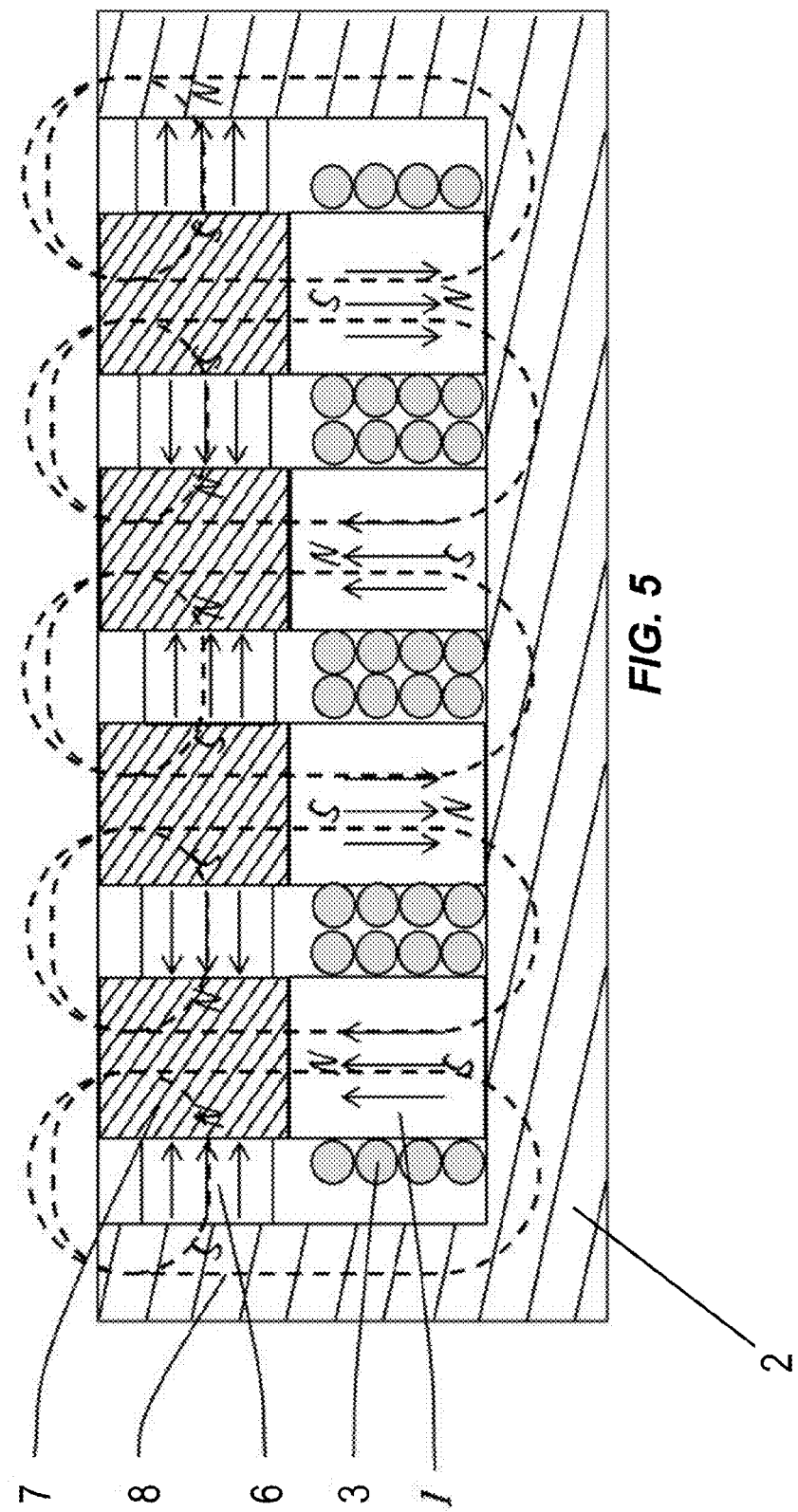
FIG. 5 depicts a permanent electromagnetic array in the ON state.

Permanent-Electromagnetism: Referring to FIGS. 4 and 5, these drawings show a section view of a typical permanent-electromagnetic circuit which uses two types of permanent magnet material. Permanent magnet 1 is surrounded by a magnetizing coil 3 and can be regarded as the "switchable" magnet. Permanent magnet 6 is permanently oriented in a fully saturated state and is regarded as "non-reversible". By controlling the polarity of the switchable magnet, the magnetic flux generated from the two sets of permanent magnet materials can be directed through the ferromagnetic pole pieces 7 and ferromagnetic body 2 externally in the ON condition or internally (within the device) in the OFF condition. The internal permanent magnets 1 some (or all) of which are surrounded by a solenoid or a coil 3 and by way of a short pulse of electrical (direct) current these magnets can be magnetized or "switched" either by reversing the magnet polarity or fully magnetizing and demagnetizing the material. As with the previous two technologies, at the ON condition, magnetic flux can be directed into the workpiece. In certain implementations as described above, rare earth magnets such as 6 are used in the assembly, and pole pieces 7 may be used to provide a contact surface forming a part of the working surface. In the present illustrations, flux lines are depicted by dashed lines such as 8.

Figure 6:
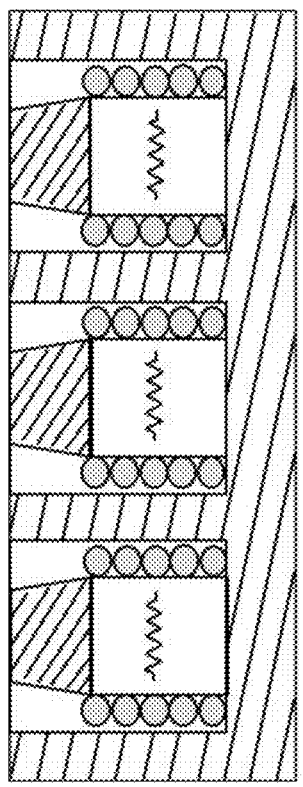
FIG. 6 depicts a permanent electromagnetic array in the OFF state.

FIG. 6 depicts an example magnetic array in the OFF condition.

Figure 7:
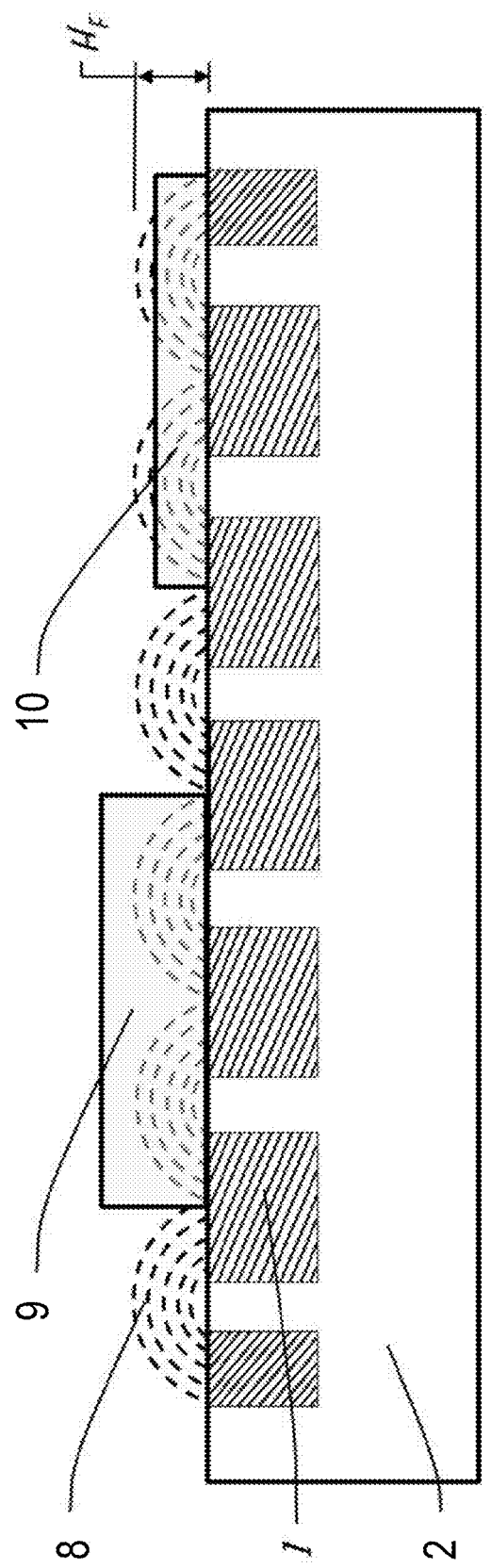
FIG. 7 is a drawing that depicts a working surface of magnetic holding system and an array of switchable magnets arranged as a magnetic holding system in a manner consistent with certain embodiments of the present invention.

In general terms, the pole size and spacing has the biggest influence on the type of magnetic field produced. Referring to FIG. 7, small poles 1 placed close together generate a field height that is shallow making this type of pole design suitable for thin workpieces—this pole spacing is sometimes called "fine" or "micro". Conversely, magnetic holding devices with large poles and a coarser pole pitch are best suited for thicker or larger workpieces—this pole spacing is sometimes called "standard". Pole shape makes little difference to the law of flux height $H_f$ in relative terms. Poles can be round, square, rectangular, or a combination of multiple shapes, etc., and the calculation of field height remains the same. An incorrect pole design for the load or workpiece thickness will often prove inefficient both in terms of nuisance flux (leakage) and actual clamp force. In this example, substantially all of the flux lines are contained within workpiece 9, but for example workpiece 10 is thinner and the flux height is greater than the thickness of the workpiece 10, which may create a nuisance in holding the workpiece 10 to unintended objects (i.e., metal shavings or additional layers of material 10 that is to be moved as well as a loss in clamping force.

Magneto Motive Force (MMF) is an important function of a Magnetic Holding Device. It is the internal force that drives the magnetic flux around the circuit. MMF can be compared with an electrical circuit (Ohms Law), MMF=$\Phi \times R$, where R is reluctance and $\Phi$ is magnetic flux, the more resistant (or reluctant) the magnetic circuit, the more MMF required to drive the magnetic flux.

With an electromagnet, MMF=$I \times t$ (where I=Amps and t=number of turns on the coil).

Simply increasing the current supplied to the coils will result in higher MMFs. However, electromagnet MMF can be limited due to increased operating temperatures which may impair the usage level and overall life of the coils.

With any Permanent Magnet system, MMF=$H \times L$ (where H=Magnet Field strength and L=Magnet Length). Once the raw magnet is selected and placed in the circuit, the resulting MMF cannot be improved. With a Permanent-Electro Magnet, it is possible to reduce the MMF by reducing the electromagnetic pulse used to switch on the electromagnet, but this technique is difficult to implement accurately.

Actual Magnetic Clamp force is proportional to the square of magnetic flux density acting at the pole contact surface (F=$B^2 \times A \times K$) where F=force, B is the flux density, A is the pole contact area and K is a constant, it is important, therefore, for the designer to maximize this flux density for optimum force even at the expense of contact area. Permanent-electro Magnet designs can use a greater area of magnet materials compared to the contact area of the pole with the workpiece or load to ensure maximum flux density. This is referred to as magnetic saturation.

All known past designs of permanent and permanent-electro magnets provide for fixed pole designs with fixed MMF capability rendering the products somewhat application selective. A need exists therefore, for a switchable permanent-electromagnet that can offer a level of variability for both of these conditions.

This need can be met with a magnetic work holding or handling device for the coupling of ferromagnetic workpieces or loads comprising of low coercive, high remanence permanent magnets assembled within a series of poles and conductors of which two separate and controllable circuits of solenoids are designed to orient said magnets through a short electromagnetic pulse with the aim of providing varying levels of magneto motive force and magnetic flux height with the added capability of a level of demagnetization to the load or workpiece.

Figure 8:
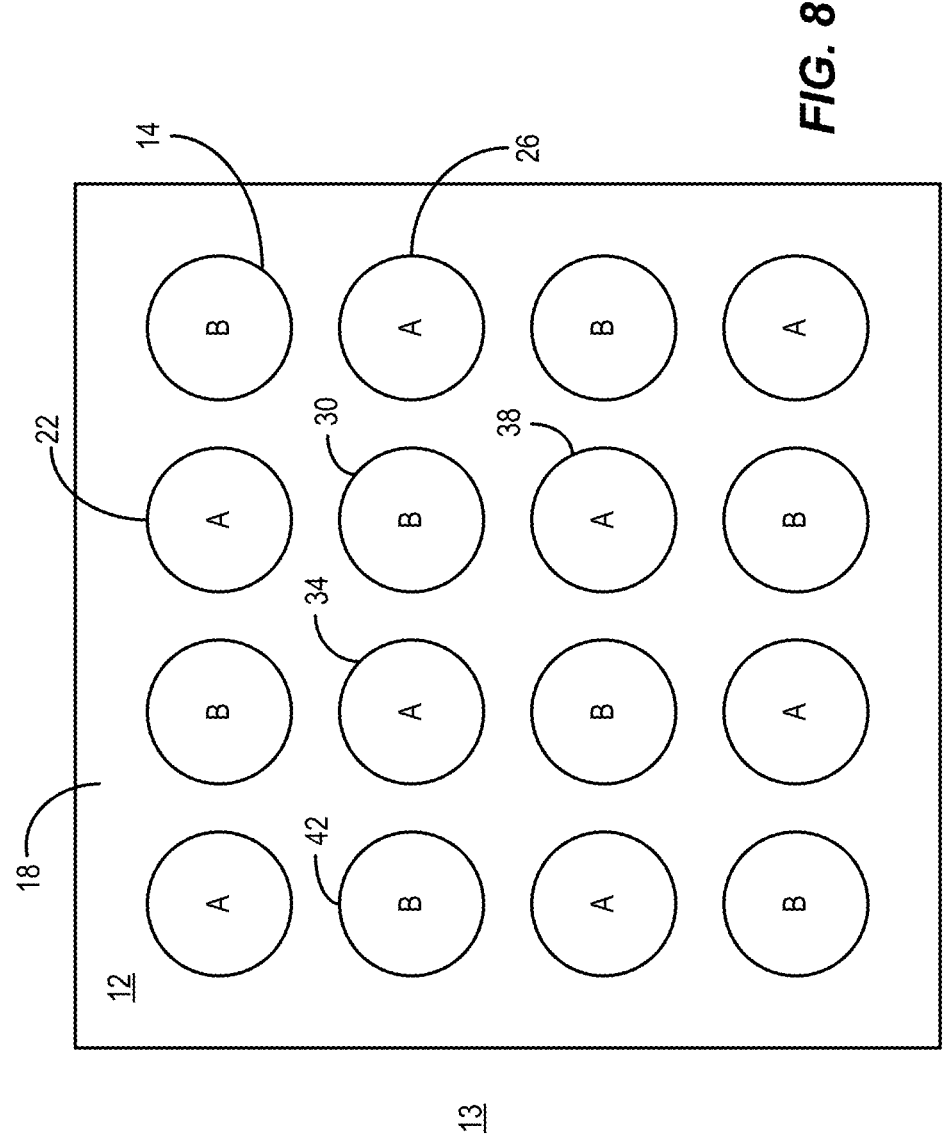
FIG. 8 is a plan view of a working surface of a switchable magnet and pole in an array showing magnetization of the individual magnets in a manner that produces an induced pole system array consistent with certain embodiments of the present invention.

Turning now to FIG. 8, an example of a working surface 12 of an array assembly 13 of switchable magnets is depicted. In this example, each of the switchable magnets have several components that make up the magnet assemblies and as shown have a circular face (generally in the form of a pole piece) such as that of magnet 14 for example. It is to be carefully noted, however, that while the illustrative examples shown in this document utilize a circular face profile, this is not to be limiting since square, rectangular and other shapes and combinations of shapes are also valid. The working surface, for purposes of this document and as noted above, is the surface that contacts a workpiece to carry out the holding, clamping, moving or other action. In this case, the working surface is made up of the pole pieces of each of the plurality of individual magnet assemblies. The surrounding surface acts as both a carrier 18 for the individual magnet assemblies and is made of a ferromagnetic material which, in some operational configurations, serves as an induced magnetic core serving as an induced magnetic pole forming a part of the magnetic working surface.

Each of the circles shown on the array is an individual magnet assembly with the working surface having, in general, a plurality of such magnet assemblies. The surface of the magnet assemblies are generally pole pieces that conduct the magnetic flux while protecting the more fragile magnetic material below the surface from damage due to contact with workpieces, etc. For the example shown, the magnet assemblies are arranged to act as switchable permanent magnets and may be in a configuration, for example without limitation, similar to that depicted un U.S. Pat. No. 6,489,871. In such a magnet assembly, the windings surrounding a relatively low coercivity metal magnet (e.g., an ALNICO magnet with windings) can be energized with one or more pulses of electricity to "energize" the material thereby polarizing the magnet and converting it into a permanent magnet. The polarity of the resulting magnet depends upon the direction of current flow through the windings. In certain implementations, the magnetic strength can be concentrated by use of conic section shaped pole pieces and/or the addition of rare earth permanent magnets to augment the assembly as shown in the above-referenced patent.

Referring back to FIG. 8, it is noted that the array of magnets 13 is simply arranged into four rows of four magnets each in this example. Of course, other arrangements are also possible and contemplated (e.g., 3×4, 6×9, 2×12, etc.). For the present example arrangement, it is further noted that in each row and each column of the array, the magnets are designated either "A" or "B" as a designation of two subsets or groups making up the array. As will become clear upon consideration of the present discussion, the array can be arranged in more than two subsets or groups without limitation.

In the present example consider the case of each individual magnet assembly. In this example, each magnet assembly has between two and four "closest neighbor" magnets in the array. So, for example, magnet 14 which is in group "B" has two closest neighbor magnets 22 and 26 which are in group "A". In general, this example array is arranged such that each magnet is equidistant from each adjacent magnet in the array. Hence, while magnet 30 is the closest magnet to magnet 14 along a line from the center of magnet 14 to the lower left corner of the array, it is not considered a "closest neighbor" since it is further away from magnet 14 than magnets 22 and 26.

In a similar manner, magnet 30 is surrounded by four nearest neighbor magnets 22, 26, 34 and 38. Magnet 30 is in group "B" while magnets 22, 26, 34 and 38 are in group "A". As described in U.S. Pat. No. 6,489,871, each of these magnets in the full array can be energized by application of a pulse that determines the polarity of the magnet and converts the magnet into a permanent magnet. When each of the individual magnets are arranged so that they are all polarized in the same polarity as depicted in FIG. 11 where all pole pieces at the surface are polarized to be North (but could equally well be polarized so that they are all South), the arrangement operates as an induced pole system. Such a system has high magnetic strength and can be shown to be optimum in holding power in many magnetic holding systems. In addition, the induced pole system generally has a relatively low flux height $H_f$ which can be advantageous in holding relatively thin materials or materials that are undergoing surface machining.

Figure 9:
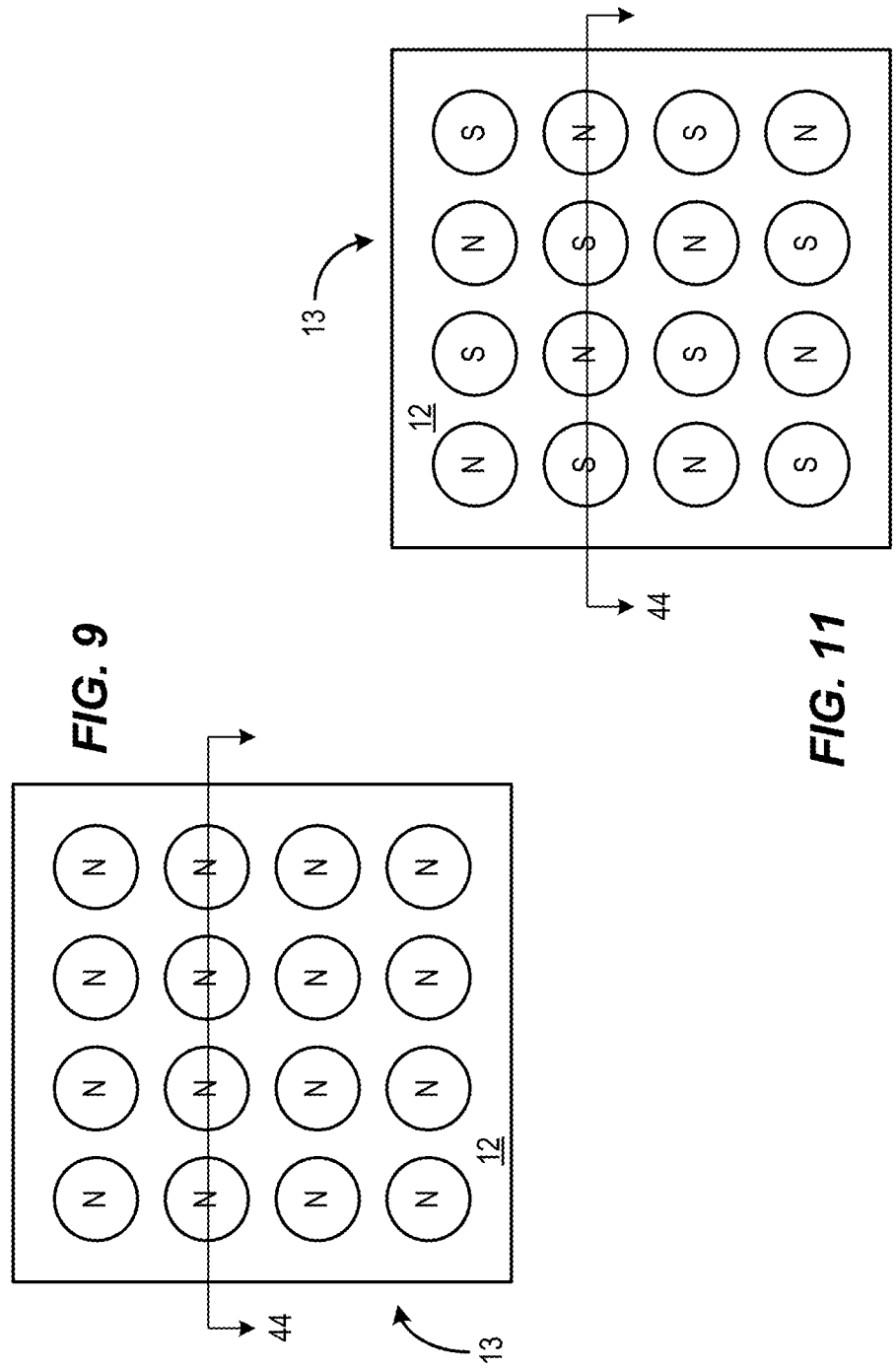
FIG. 9 is a plan view of the switchable magnet and poles in an array of FIG. 8 configured as an induced system in a manner consistent with certain embodiments of the present invention.
Figure 10:
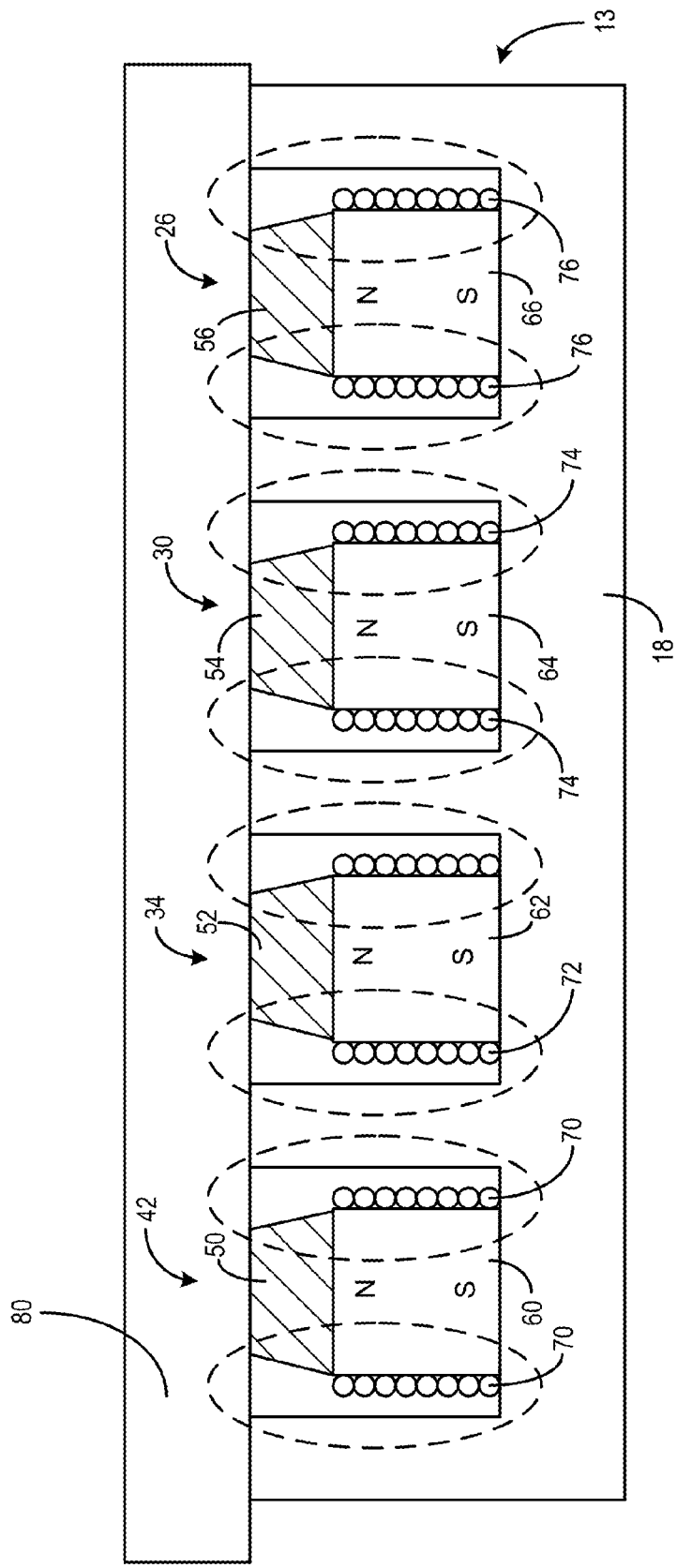
FIG. 10 is a cutaway view of the switchable magnet and poles of FIG. 9 along lines 44 with a workpiece in place consistent with certain embodiments of the present invention.

Referring now to FIG. 10, this drawing depicts the assembly 13 of FIG. 9 along lines 44. Note that this assembly is a cutaway of the same as that depicted in FIG. 8 so that the four individual magnet assemblies are labeled as 42, 34, 30 and 26. Further, this assembly is simplified over that of the above-referenced patent for ease of illustration and clarity. Each of these individual magnet assemblies has a pole piece 50, 52, 54 and 56 respectively. These pole pieces are shown with cross-hatching. The remaining elements are shown absent such cross-hatching for clarity in depiction of the various elements and flux paths, but it is to be understood that the various elements are indeed representative of a cross-section. The pole pieces form a portion of the magnetic working surface 12 of the array. The pole pieces are shown as conic sections that provide a narrowing of the surface so as to concentrate the lines of flux from each of the magnets 60, 62, 64 and 66 of the individual magnet assemblies, but this is not to be considered limiting. The magnets 60, 62, 64 and 66 in this example are low coercivity magnets such as ALNICO metal magnets with each being respectively wrapped with coils of wire 70, 72, 74 and 76 that are used to magnetize and demagnetize the magnets by application of the appropriate currents thereto. However, this is not to suggest that higher coercive magnets could not be used.

To magnetize the magnets, a pulse of polarized current is passed through the magnet's windings. The magnets can be demagnetized by passing a decaying sinusoidal current through the windings to alternately supply positive and negative decaying current to the coils. The coils can be arranged electrically either in parallel or in series to magnetize or demagnetize the permanent magnets thereby switching the magnets on and off respectively. There may be advantages in some implementations of using either electrically parallel or electrically series coils. In some production devices, parallel windings may have the advantage of permitting use of a single coil specification that is selected based only upon the particular voltage to be used for energizing the magnets, with different size coil wires used for different line voltages (110-120, 220-240, or 440-480 volts). Thus, when the coils are in parallel any number of coils can be exposed to the same voltage. When used in series, the specification of the coil itself will need to be varied based upon the final coil arrangement and number of coils as well as the voltage, as will become more clear upon consideration of the remainder of the present discussion.

Considering individual magnet assembly 42 by way of example, the flux lines are depicted in dashed ovals that pass from the North pole of magnet 60 through the pole piece 50 and then through the workpiece 80 (if present) and then through the carrier 18 that conducts the flux back to the South pole of the magnet. It is noted that rare earth magnets can be placed between the pole pieces and the core in the manner depicted in the above-referenced patent, but are omitted from this illustration for clarity.

In this arrangement, the carrier or body 18 is employed as an induced pole to complete the magnetic circuits. Such an induced pole system has high holding force with the feature of low flux height $H_f$ which can be advantageous in certain circumstances (e.g., when the workpiece is to be machined on the surface opposite the side contacting the working surface). In other words, the flux lines can be more readily constrained within the workpiece.

Figure 12:
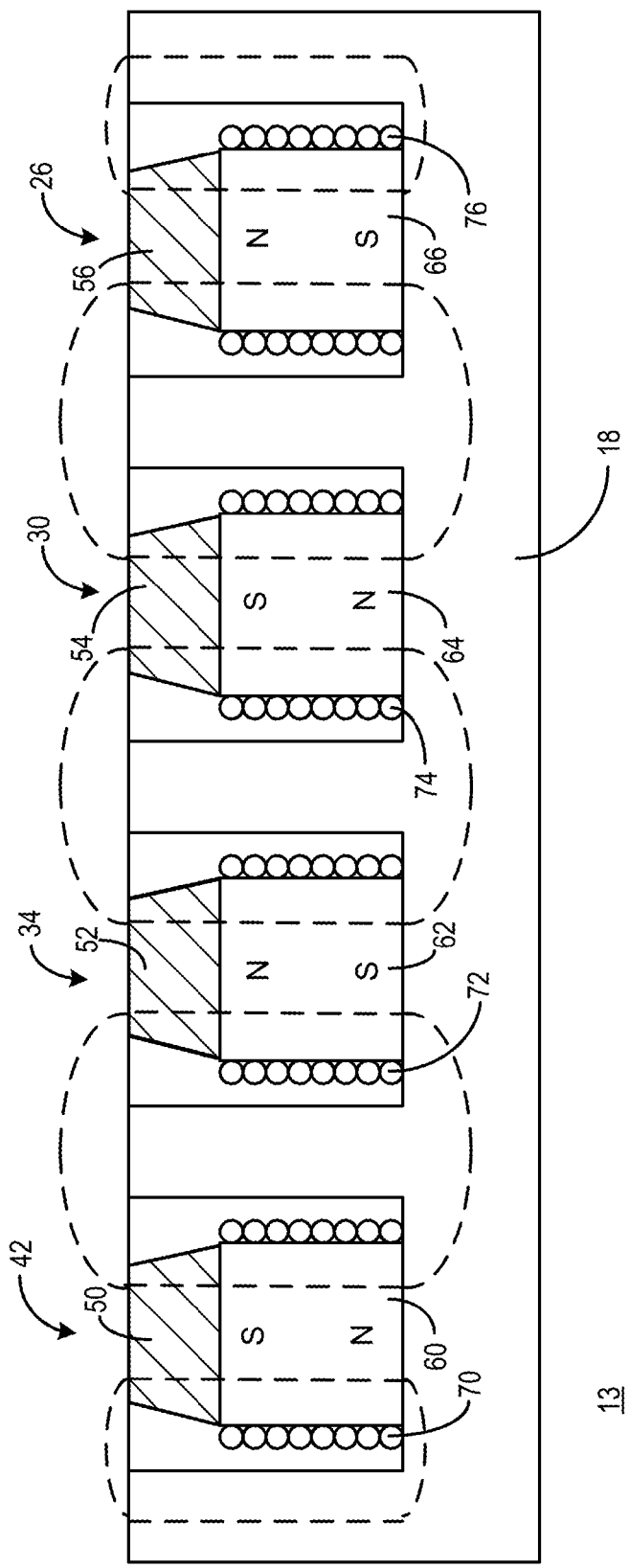
FIG. 12 is a cutaway view of the switchable magnet and poles of FIG. 11 along lines 44 without a workpiece in place consistent with certain embodiments of the present invention.

However, in other applications it may be acceptable or even desirable to provide greater flux depth and field strength. This can be accomplished using a true pole system which effectively increases the length of the magnet and has a greater flux height. The present assembly can be converted to a true pole system by use of the magnetic grouping discussed above. This is accomplished by energizing the magnets in the two groups "A" and "B" with opposite magnetic polarity as depicted in FIG. 11. When the array 13 is magnetized in this manner, flux tends to primarily flow from true N pole pieces to their closest neighboring true South pole pieces. Some exceptions will occur around the perimeter magnets where some of the flux may flow into the body 18, but the bulk of the flux will pass from pole piece to pole piece. This is depicted in cross-section along lines 44 in FIG. 12 which is shown without benefit of a workpiece so as not to obscure the drawing. In this drawing, it is noted that alternating individual magnet assemblies such as 42 and 34 are magnetized with opposite polarity. The individual components of FIG. 12 are the same elements as shown in FIG. 10 except for the alternating magnetization as described. However, by use of this alternating pattern of polarization, the array is converted to a true pole system with deeper flux height from pole to pole (with some residual shallower flux height around the perimeter).

In the example given above for a work-handling system that lifts large sheets of one inch steel as the workpiece 80. In designing such a work-handling system (in this case a lifting system), air gap performance is among the most significant parameters. Such systems are generally designed in a manner that maximizes MMF. Such a lifting system generally uses a special purpose magnetic holding device specifically designed for the object being lifted.

Now consider that if one wished to use the same system to lift lighter ¼ inch thick steel plates from a stack. When the designer designs a system that has to lift one inch steel plates, the typical target of maximum MMF will quite likely result in flux lines that are approximately one inch in depth so as to be so deep as to pass through multiple ¼ inch plates. Hence, the lifter designed for one inch plates would likely pick up more than one sheet of ¼ inch plates, which is likely an unacceptable condition. Given that such a lifting magnet array is generally designed for maximum MMF, the same magnetic lift system may not be readily repurposed to lift ¼ inch steel plates without danger of lifting multiple ¼ inch steel plates.

Hence, in accord with the present teachings, when deeper flux lines suitable for picking up a one inch steel sheet are needed, the configuration of a true pole system of FIG. 12 can be utilized. Additionally, the system can be reconfigured as an induced pole system as depicted in FIG. 10 when a reduced flux height $H_f$ is desired (as in picking up a ¼ inch thick steel plate from a stack). Additionally, reconfiguration of the array to utilize fewer magnets and other variations can be implemented in a manner consistent with the present teachings.

To recap, FIGS. 4-12 thus show sectional views of magnetic circuits according to the present discussion. In this design only a single "switchable" permanent magnet 1 is provided for the generation of magnetic flux. Also, in this design and unlike the double magnet system discussed earlier, the single magnet is fully demagnetized by a reciprocating and reducing electromagnetic field through the surrounding coil(s) 3 which removes the flux in the OFF condition of FIG. 6. The permanent magnet and coils reside under a pole 7 and the components are isolated from the ferromagnetic body by an air-gap 6 at the top surface. The poles can be tapered to provide maximum working flux density at the polar top surface. The ferromagnetic body 2 in this case becomes an "induced" pole at the top surface and provides a return path for the magnetic field generated by the permanent magnet in FIG. 10. A second set of coils placed adjacent to the coil 3 which enables independent control of the contained magnet and pole assembly for the adjacent magnet.

When all coils are energized by an electromagnetic pulse in the same direction, then the magnetic device is switched to the ON position as shown in FIG. 10 with flux directed and as stated previously, commonly termed "induced pole" with fine pole spacing, the height of the magnetic field emanating from the magnet is relatively compact. When the second set of coils receive an electromagnetic pulse in the opposite direction to the first set of coils, the magnetic device is switched to the ON position as shown in FIG. 12. The "push-pull" effect of the two permanent magnets cause the magnetic field to bypass the induced pole of the ferromagnetic body with a consequence of a "true pole" magnetic field.

The resulting loss in pole quantity causes a greater magnetic field height and the doubling of magneto motive force because the switchable permanent magnets are now acting in "series".

Figure 13:
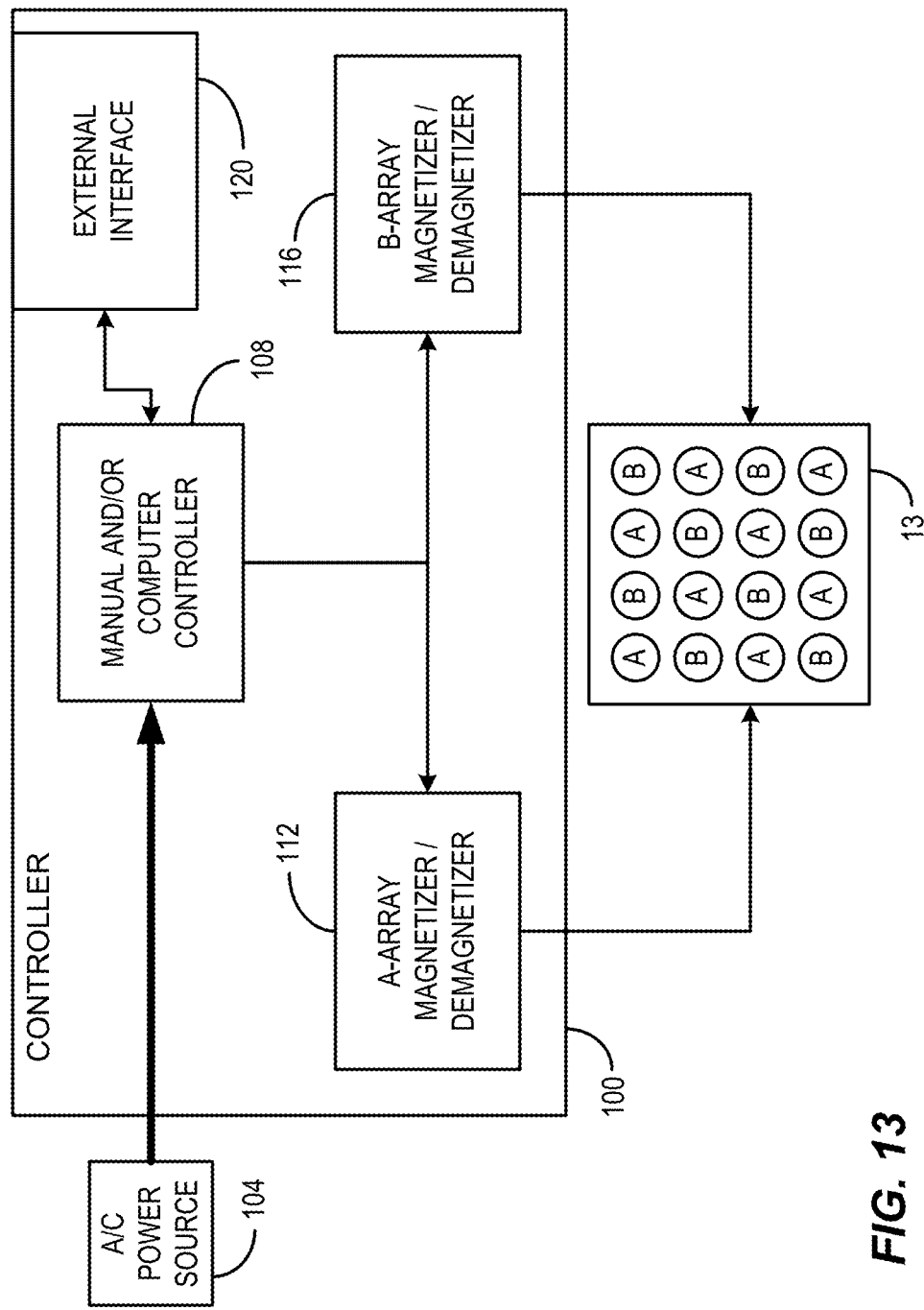
FIG. 13 is an example system block diagram of a switchable magnet system with two groups of magnets and controller for magnetizing and demagnetizing same in a manner consistent with certain embodiments of the present invention.

Referring now to FIG. 13, the array of magnets such as 13 can be controlled using a manual or computerized controller 100 that is powered from an alternating current power source (i.e., the power mains) 104 which supplies power to the controller 108. In the simplest form, controller 108 may simply provide a set of controls for a user in which the user manually selects the operational mode individually of the "A" magnets or the "B" magnets. This is accomplished via a pair of magnetizer/demagnetizer circuits 112 and 116 that are connected to the "A" coils and the "B" coils respectively. In a manual mode of operation, the user decides whether to operate the system as a true pole system or an induced pole system. In an automated system (such as in a computer controlled industrial environment), an external interface 120 to computer 108 can send receive external directives to the controller 108 via any suitable communication protocol (e.g., serial or USB). Interface 120 may also include switches or buttons or other user interface suitable for manual control or override of any automated process.

In certain implementations, the magnets are "charged" substantially simultaneously by use of the positive or negative pulses from the AC supply mains. So, when two groups are charged to opposite polarities, one group may be charged by the positive half cycle of the supply mains while the other group may be charged by the negative half cycle of the power supply mains with the positive and negative pulses being separated by ¹⁄₆₀ of a second. Generally, exposure of the coils to charging currents large enough to permanently magnetize a permanent magnet has a short duration and commonly less than about 1 second.

In either case, a process similar to that depicted in the example flow chart 150 of FIG. 14 controls the charging of the "A" and "B" magnets starting at 154. At 158, a user or external computer that controls a process determines what which configuration of the array is to be used. In this case, the selections are true pole, induced pole and demagnetize. However in other systems, as will be explained later, other modes of operation may also be provided (such as charging certain groups or subgroups of magnets to operate as a true pole system, charging certain groups or subgroups of magnets to operate as an induced pole system, charging only certain of the magnets in either configuration, demagnetizing certain magnets, etc.). In the present system if a true pole system is desired, this is selected at 162 and the process proceeds to 166 where the two groups of magnets are charged with pulses having opposite polarity for each group.

Alternatively, the selection may be to magnetize the array of magnets to operate as an induced pole system at 162, in which case the two magnet arrays are charged with pulses having the same polarity. If the magnets are already charged, the selection at 162 may involve demagnetizing the arrays by application of a decaying sinusoidal current to demagnetize the magnets at 174. For purposes of this discussion, any magnetizing or demagnetizing action can be considered a cycle whether associated with a time or other event. When the current cycle is deemed to be completed at 178, control passes back to 158 where the next cycle begins. Many variations are possible to this process to manipulate the properties of the magnetic array depending upon the level of individual addressability of each group of coils in the particular system at hand. Hence, the array of magnets can be magnetized such that any addressable magnet or group of magnets can be configured with any polarity, not magnetized, or demagnetized as desired for the action to be accomplished.

Figure 15:
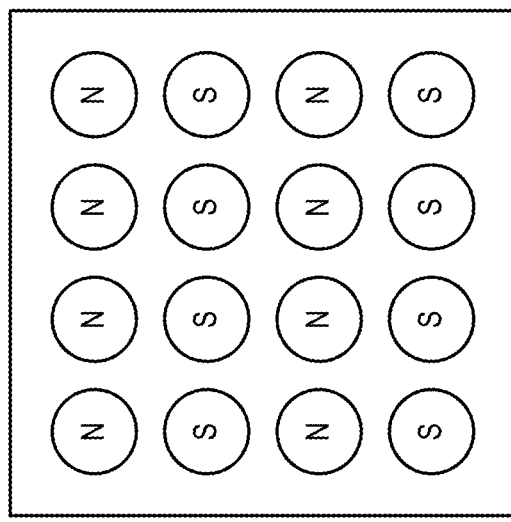

As suggested above, any particular array can be configured as desired in order to manipulate the magnetic properties of the magnetic array. By way of example, and not limitation, FIG. 15 shows array 13 configured with each row of magnets having been polarized with opposing polarity. This arrangement can equally well be implemented using columns having opposing polarity. Such a configuration can simplify the design of top tooling. In non-planar configurations of the working surface, the system can be configured to provide opposing polarity to each side of a V-block (or vee-block) where one rail is of one polarity and the other rail is of the other polarity so as to readily hold a round bar workpiece.

In the examples that follow, any of a plurality of configurations of the magnet arrays can be realized with the only limitation being that the array of magnets be configured electrically in such a manner as to provide access to a suitable grouping of the magnets and thereby access to the appropriate sets of coils for each possible grouping. In the limit, and in the abstract, it might be desirable to have access to each and every magnet coil in the array within a single carrier or body. However, the array can also be designed with any suitable grouping of coils arranged in parallel or series so as to provide access for charging any desired grouping. The tradeoff here is that more groups complicates the wiring somewhat, but provides for greatest versatility, while fewer groups can be used when only a few configurations are contemplated. Many variations will occur to those skilled in the art upon consideration of the present teachings. The examples presented herein assume that the particular groupings presented are available for magnetizing and demagnetizing in the groupings shown in any suitable manner.

Figure 16:
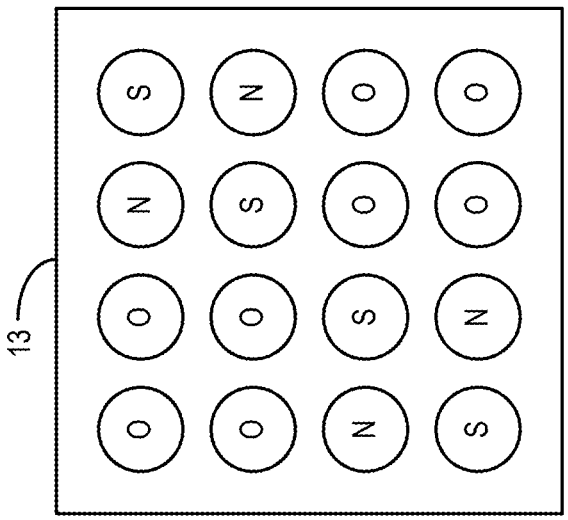
FIGS. 15-18 are example configurations of alternative implementations with variations in the charging of the magnets in an array of magnets in a manner consistent with certain embodiments of the present invention.

FIG. 16 shows array 13 magnetized such that only the four magnets in each of the upper right and lower left corner are magnetized in a true pole configuration. Such a configuration presumes that the true pole configured magnets can be addressed to be charged as shown and the magnets that are not used can be addressable for demagnetization. Magnets showing an "0" in FIG. 16 are not magnetized or demagnetized or "OFF".

Figure 17:
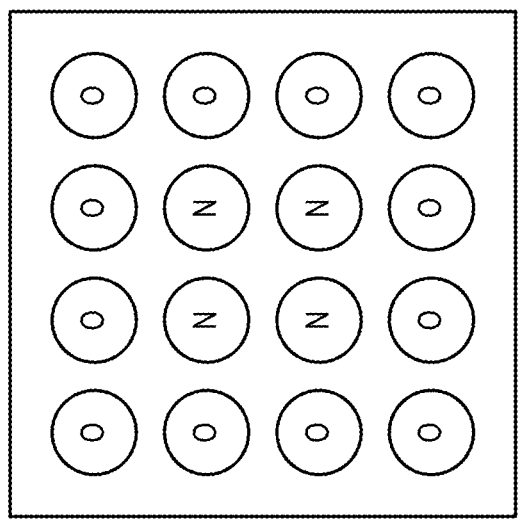
Figure 18:
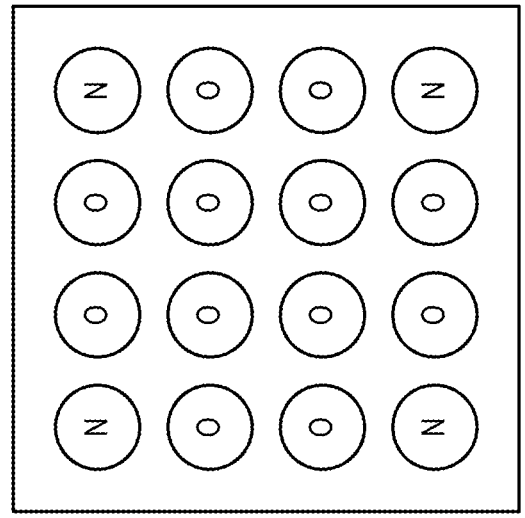

FIG. 17 depicts another example where all magnets are off in the array except for a sub-array made up of the four centermost magnets which are magnetized with the same polarity—presumably to pick up or hold a smaller object and possibly a thinner object. This configuration similarly presumes that at least the outer perimeter of magnets can be addressed to demagnetize and the center four magnets can be magnetized collectively as a group or individually or in pairs, etc. to effect the pattern depicted. Similarly, various configurations can facilitate avoiding accumulation of magnetic debris from milling and machining operations. In another illustrative example of the many possibilities, FIG. 18 depicts only the magnets at each of the four corners are magnetized with the same polarity. This, of course, implies that these magnets can be addressed for charging individually or as a group or groups while the remaining magnets can be addressed for demagnetizing as a group or groups or individually.

FIG. 19 depicts further illustrative examples, in this case examples of a four circuit system in various configurations. This illustration of FIG. 19 shows a top view of an example 4-circuit system showing a proposed connection method for coils and through independent control of these coils, the resulting polarity of the poles in the ON condition. Any other suitable combination is possible without limitation consistent with implementations in accord with the present teachings. Moreover, the magnetic configuration can be changed during a machining operation so as to avoid magnetizing a portion of a workpiece as it is machined by positioning the active magnets at locations that are separated from the machining action and by controlling the location of magnetic flux passing through the workpiece. That is, to have portions of the magnetic array turned off while the workpiece is being actively machined in the area of the magnets. Other variations will occur to those skilled in the art upon consideration of the present teachings.

Figure 20:
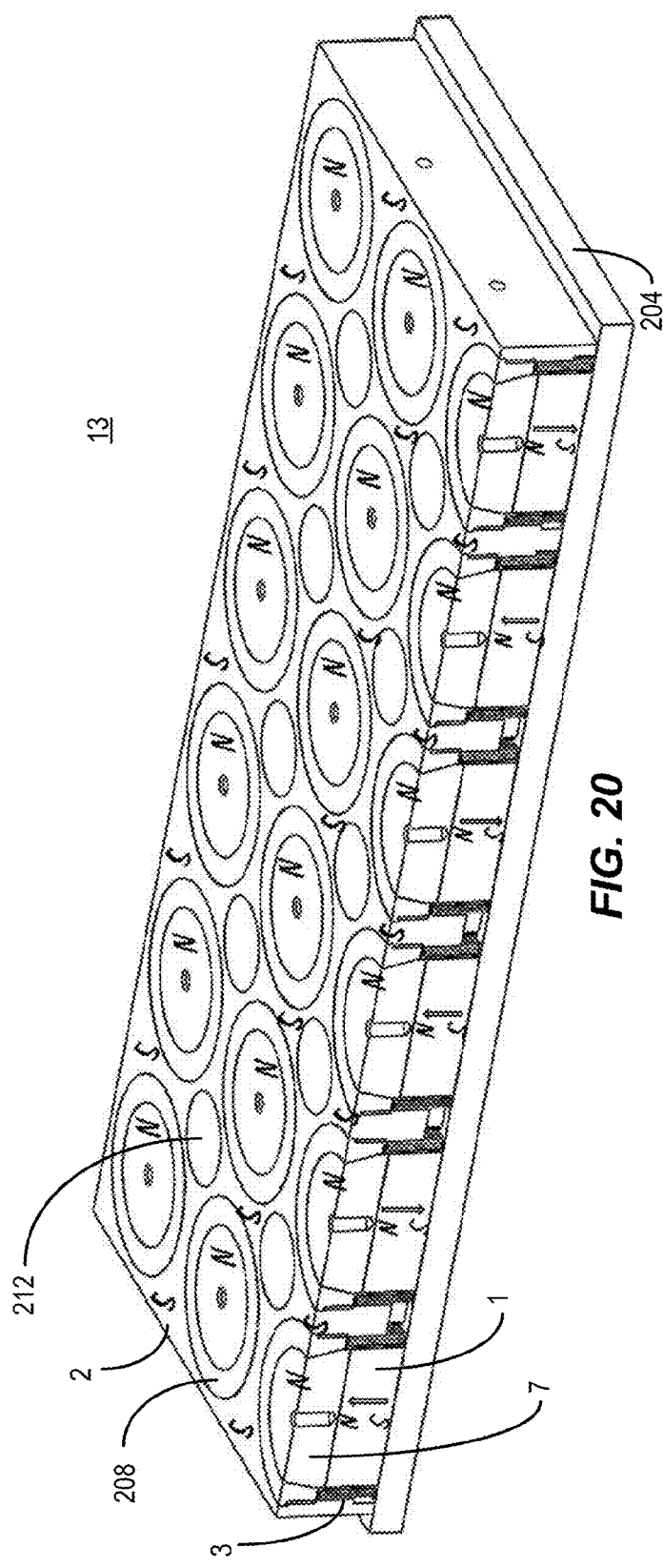
FIG. 20 is an example array of magnets shown in isometric cutaway and configured as an induced pole system consistent with certain embodiments of the present invention.

FIG. 20 shows an example isometric and cut out view of an example assembly 13 consistent with certain implementations of the present invention operating as an induced pole system as indicated by the magnetic polarity of N and S designations on the drawings. The assembly shows the use of round permanent magnets 1, coils 3 and pole pieces (poles) 7 contained within a ferromagnetic body 2 which itself is attached to a ferromagnetic baseplate 204 that serves as a portion of the body and as an electromagnetic conductor of flux. All poles are isolated from the load/workpiece contact surface by a non-magnetic spacer 208. Special nonmagnetic inlays 212 are placed in the body surface to balance the body area to approximately the same surface area as the surface area of the poles for a more balanced induced pole operation. This design is not limited to round poles—any geometric shape such as square or rectangular can be utilized.

Figure 21:
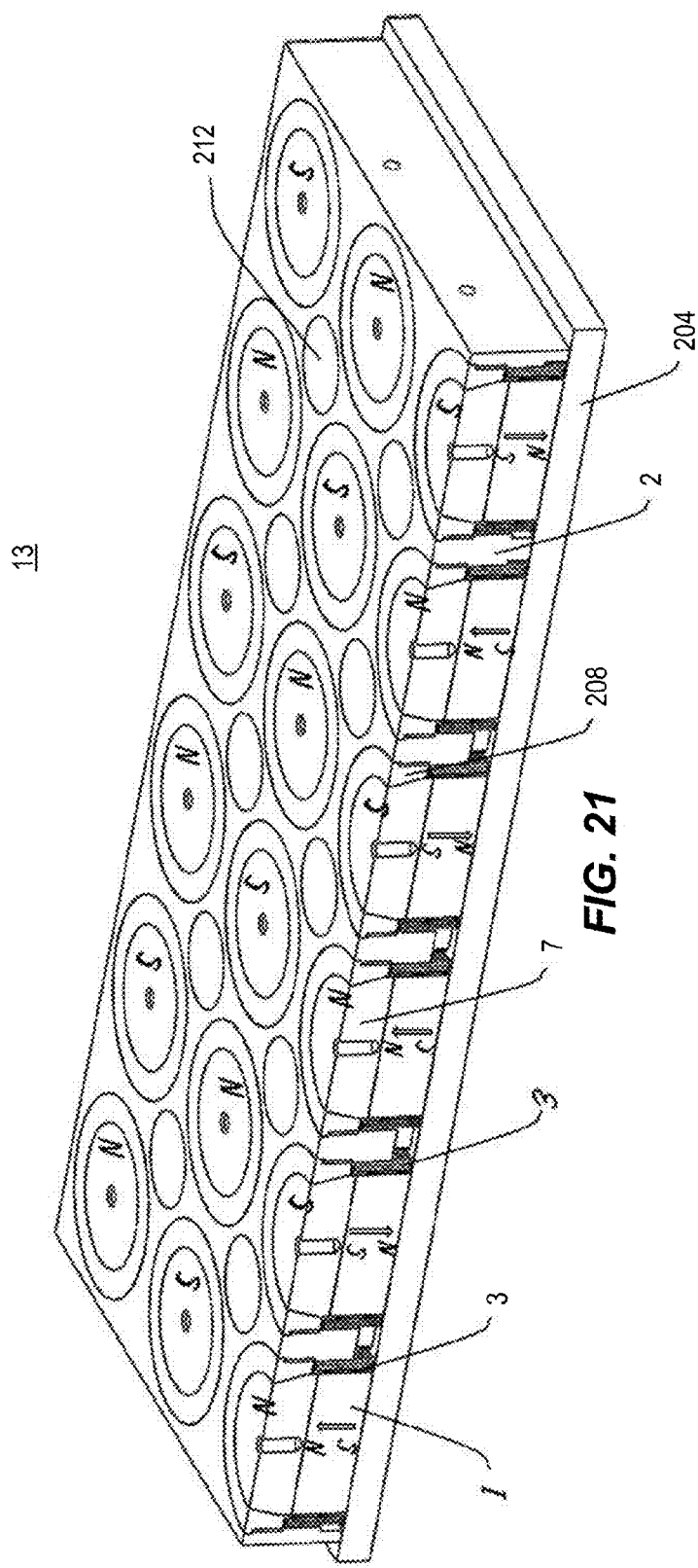
FIG. 21 is an example of an array of magnets shown in isometric cutaway and configured as a true pole system in a manner consistent with certain embodiments of the present invention.

FIG. 21 depicts the same assembly as FIG. 20 with the magnet groups configured for a true pole system as indicated by the N and S designations in the drawing.

Figure 22:
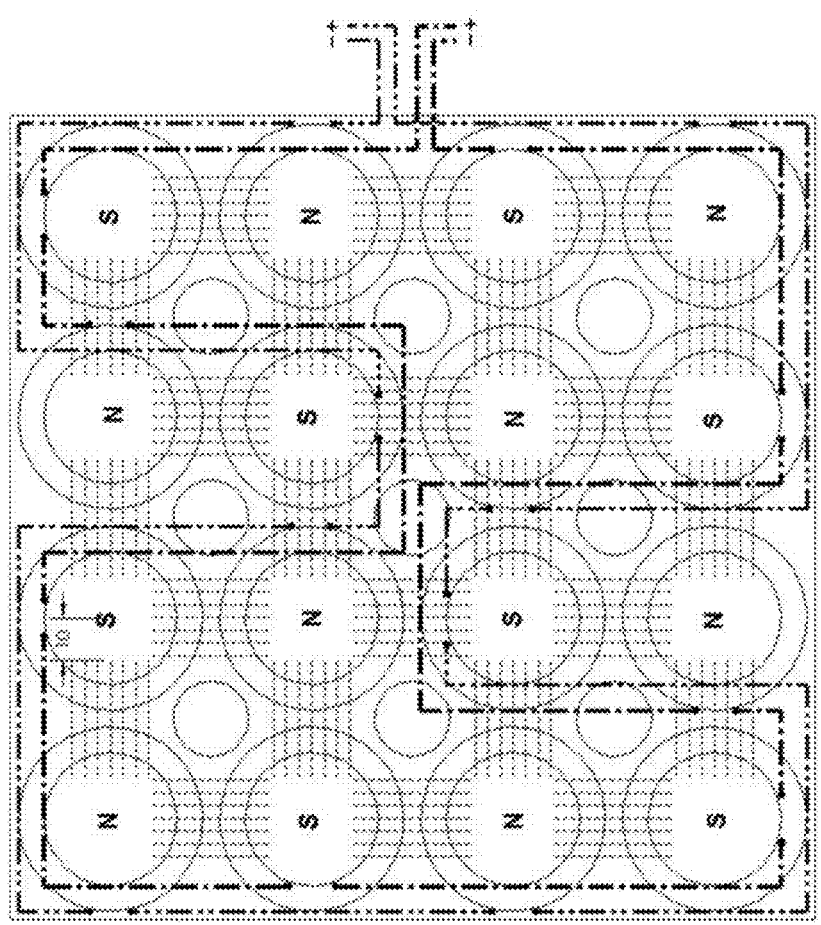
FIGS. 22-23 depict an example of the wiring configuration of an example system consistent with certain embodiments of the present invention, where
Figure 23:
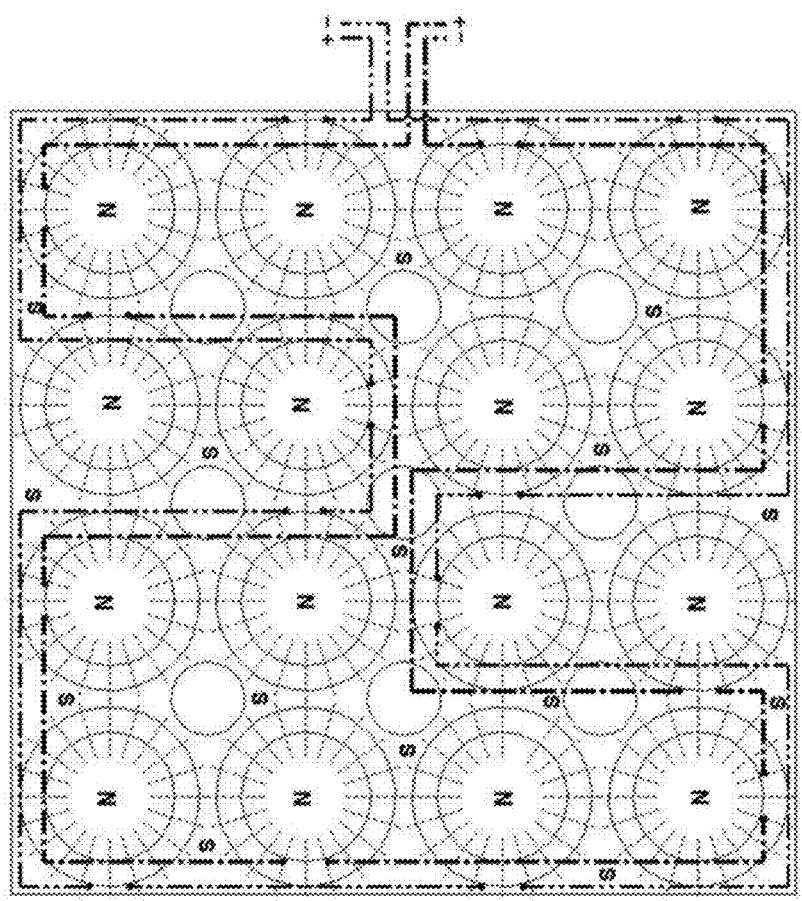

FIGS. 22 and 23 show a top view of an assembly showing the connection for two sets of coils, the applied electromagnetic field direction and the resulting polarity of the poles for the two ON conditions. Of course, other arrangements for connecting the coils may also be used for providing two or more sets or subsets of magnet groups as desired. In this arrangement, all of the coils are shown to be connected in parallel, and the wiring path can be enclosed within a routing in the base plate and/or body. Other configurations can be utilized to realize more than two groups of magnets, or additional wiring can be run along the same routes without limitation.

Figure 24:
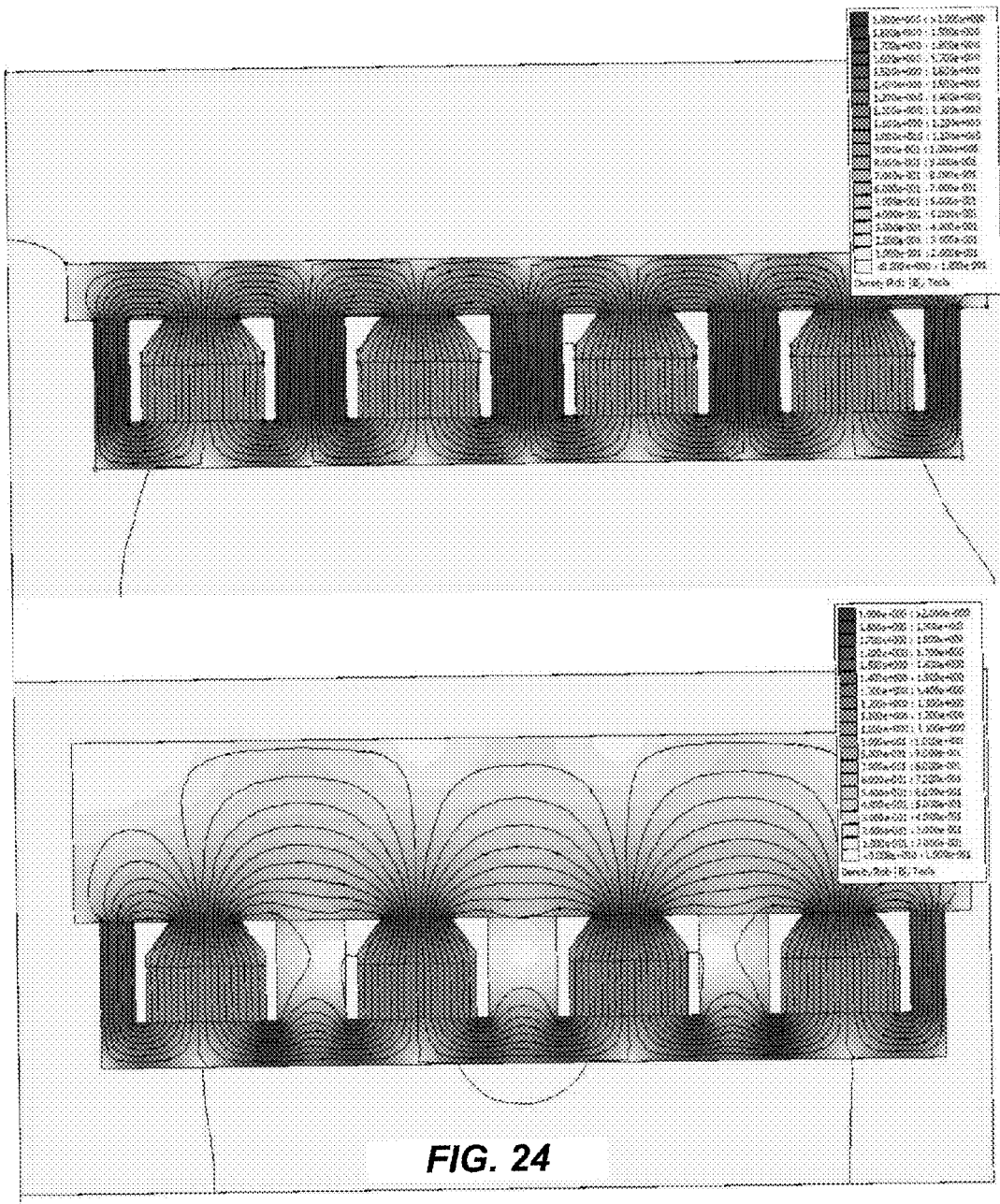
FIG. 24 is a computer simulated graphic showing the likely magnetic flux paths between the two ON states described above for assembly 13 depicting the flux height and the intensity.

FIG. 24 is a computer simulated graphic showing the likely magnetic flux paths between the two ON states described above for assembly 13 depicting the flux height and the intensity.

Thus, a magnetic holding device uses an array of switchable magnets. A carrier holds the array of switchable magnets to form a working surface. Each switchable magnet has a coil of wire surrounding a magnetizable core element. The array is arranged in groups of magnets. A circuit is coupled to the coils to selectively magnetize and demagnetize each group of switchable magnets to selectively independently place each group into one of these states: an ON state that configures the selected group to have a first magnetic polarity at the working surface, an ON state that configures the selected group to have an opposite magnetic polarity at the working surface, and an OFF state that configures the magnets in the selected group to have no magnetism at the working surface.

Thus, in certain example implementations, a magnetic holding device has an array of a plurality of switchable magnets. A carrier holds the array of switchable magnets to form at least a portion of a working surface. Each switchable magnet in the array has a coil of wire surrounding a magnetizable core element. The array is arranged in a plurality of groups of one or more switchable magnets in each group. A magnetizing and demagnetizing circuit is coupled to the coils and configured to selectively carry out magnetizing and demagnetizing actions on each group of switchable magnets so as to selectively and independently place each group of switchable magnets in the array into a selected one of the following states: a first ON state that configures the selected group to have a first magnetic polarity at the working surface, a second ON state that configures the selected group to have a second magnetic polarity that is opposite the first magnetic polarity at the working surface, and an OFF state that configures all of the switchable magnets in the selected group to have little or no magnetism at the working surface.

In certain implementations, the switchable magnets each comprise a pole piece coupled to one pole of the core element. In certain implementations, at least a portion of the working surface operates as a true pole system. In certain implementations, the carrier is ferromagnetic and at least a portion of the working surface operates as an induced pole system. In certain implementations, at least a portion of the plurality of switchable magnets are switchable permanent magnets. In certain implementations, at least a first portion of the plurality of switchable magnets are switched to a demagnetized state while at least a second portion of the plurality of switchable magnets are switched to a magnetized state. In certain implementations, the array is arranged in two groups of one or more switchable magnets in each group. In certain implementations, the array is arranged in more than two groups of one or more switchable magnets in each group. In certain implementations, the OFF state is achieved by application of a decaying sinusoidal current to the coil of the magnet being demagnetized. In certain implementations, the ON state is achieved by application of a series of polarized pulses of current to the coil of the magnet being magnetized.

Another example implementation of a magnetic holding device has an array of a plurality of switchable magnets. A ferromagnetic carrier holds the array of switchable magnets. Each switchable magnet in the array has a coil of wire surrounding a core. The array is arranged in at least first and second groups of switchable magnets on the ferromagnetic carrier. A magnetizing and demagnetizing circuit is coupled to the coils and configured to selectively carry out magnetizing and demagnetizing actions on each of the first and second groups to put the switchable magnets in the array into one of the following states: a first ON state that configures the array to be an induced pole system in which the carrier serves as an induced pole for each of the switchable magnets, a second ON state that configures the array to be a true pole system, and an OFF state where all of the switchable permanent magnets in both the first group and the second group are demagnetized.

In certain implementations, at least a portion of the plurality of switchable magnets comprise switchable permanent magnets. In certain implementations, each of the switchable permanent magnets has sufficient coercivity value so as to be permanently magnetized or demagnetized by application of a magnetizing or demagnetizing current to the coil. In certain implementations, each of the switchable permanent magnets are metal magnets. In certain implementations, the OFF state is achieved by application of a decaying sinusoidal current to the coil of the magnet being demagnetized. In certain implementations, the ON state is achieved by application of a series of polarized pulses of current to the coil of the magnet being magnetized.

Another magnetic holding device consistent with certain example implementations has an array of a plurality of switchable permanent magnets. A ferromagnetic carrier holds the array of switchable permanent magnets. Each switchable permanent magnet in the array has a coil of wire surrounding a permanent magnet. Each of the switchable permanent magnets have a sufficient coercivity level so as to be magnetized or demagnetized by application of a magnetizing or demagnetizing current to the coil. The array is arranged in at least first and second groups of alternating switchable permanent magnets on the ferromagnetic carrier, where each switchable permanent magnet in the first group has closest neighbor switchable permanent magnets that are in the second group, and where each switchable permanent magnet in the second group has closest neighbor switchable permanent magnets that are in the first group. A magnetizing and demagnetizing circuit is coupled to the coils and configured to selectively carry out magnetizing and demagnetizing actions to put the switchable permanent magnets in the array into one of the following states: a first ON state where all of the switchable permanent magnets in both the first group and the second group are magnetized to have the same magnetic polarity thereby establishing the array as an induced pole system with the ferromagnetic carrier serving as an induced pole, a second ON state where the switchable permanent magnets in the first group are magnetized to have a polarity opposite a polarity to which the switchable permanent magnets in the second group are magnetized thereby establishing the array as a true pole system, and an OFF state where all of the switchable permanent magnets in both the first group and the second group are demagnetized.

In certain implementations, each of the switchable permanent magnets comprise metal magnets. In certain implementations, the OFF state is achieved by application of a decaying sinusoidal current to the coil of the magnet being demagnetized. In certain implementations, the ON state is achieved by application of a series of polarized pulses of current to the coil of the magnet being magnetized.

Those skilled in the art will recognize, upon consideration of the above teachings, that certain of the above exemplary embodiments are based upon use of one or more programmed processors operating as a controller. However, the invention is not limited to such exemplary embodiments, since other embodiments could be implemented using hardware component equivalents such as special purpose hardware, switch arrangements and/or dedicated processors. Similarly, general purpose computers, microprocessor based computers, microcontrollers, optical computers, analog computers, dedicated processors, application specific circuits and/or dedicated hard wired logic or simple switching circuitry may be used to construct alternative embodiments.

While certain illustrative embodiments have been described, it is evident that many alternatives, modifications, permutations and variations will become apparent to those skilled in the art in light of the foregoing description.

What is claimed is:

1. A magnetic holding device, comprising:
   an array of a plurality of switchable permanent magnets;
   a carrier that holds the array of switchable permanent magnets to form at least a portion of a working surface;
   each switchable permanent magnet in the array having a coil of wire surrounding a magnetizable core element;
   the array arranged in a plurality of at least first and second groups of one or more switchable permanent magnets in each group;
   the at least first and second groups having alternating switchable permanent magnets on the carrier, where each switchable permanent magnet in the first group has at least one closest neighbor switchable permanent magnet that is in the second group, and where each switchable permanent magnet in the second group has at least one closest neighbor switchable permanent magnet that is in the first group; and a magnetizing and demagnetizing circuit coupled to the coils and configured to selectively carry out magnetizing and demagnetizing actions on each group of switchable permanent magnets so as to selectively and independently place each group of switchable permanent magnets in the array into a selected one of the following states:
a first ON state that configures the selected group to have a first magnetic polarity at the working surface,
a second ON state that configures the selected group to have a second magnetic polarity that is opposite the first magnetic polarity at the working surface, and
an OFF state that configures all of the switchable magnets in the selected group to have little or no magnetism at the working surface.

2. The device according to claim 1, where the switchable permanent magnets each comprise a pole piece coupled to one pole of the core element.

3. The device according to claim 1, where at least a portion of the working surface operates as a true pole system.

4. The device according to claim 1, where the carrier is ferromagnetic and at least a portion of the working surface operates as an induced pole system.

5. The device according to claim 1, where at least a portion of the plurality of switchable magnets comprise metal magnets.

6. The device according to claim 1, where at least a first portion of the plurality of switchable permanent magnets are switched to a demagnetized state while at least a second portion of the plurality of switchable permanent magnets are switched to a magnetized state.

7. The device according to claim 1, where the array is arranged in two groups of one or more switchable permanent magnets in each group.

8. The device according to claim 1, where the array is arranged in more than two groups of one or more switchable permanent magnets in each group.

9. The device according to claim 1, where the OFF state is achieved by application of a decaying sinusoidal current to the coil of the switchable permanent magnet being demagnetized.

10. The device according to claim 1, where the first and second ON states are achieved by application of a series of polarized pulses of current to the coil of the magnet being magnetized.

11. A magnetic holding device, comprising:
an array of a plurality of switchable permanent magnets;
a ferromagnetic carrier that holds the array of switchable permanent magnets;
each switchable permanent magnet in the array having a coil of wire surrounding a core;
the array arranged in at least first and second groups of alternating switchable permanent magnets on the ferromagnetic carrier;
the array arranged on the ferromagnetic carrier, where each switchable permanent magnet in the first group has at least one closest neighbor switchable permanent magnet that in the second group, and where each switchable permanent magnet in the second group has at least one closest neighbor switchable permanent magnet that is in the first group; and a magnetizing and demagnetizing circuit coupled to the coils and configured to selectively carry out magnetizing and demagnetizing actions on each of the first and second groups to put the switchable permanent magnets in the array into one of the following states:
a first ON state that configures the array to be an induced pole system in which the carrier serves as an induced pole for each of the switchable permanent magnets,
a second ON state that configures the array to be a true pole system, and
an OFF state where all of the switchable permanent magnets in both the first group and the second group are demagnetized.

12. The device according to claim 11, where at least a portion of the plurality of switchable permanent magnets comprise metal magnets.

13. The device according to claim 11, where each of the switchable permanent magnets has sufficient coercivity value so as to be permanently magnetized or demagnetized by application of a magnetizing or demagnetizing current to the coil.

14. The device according to claim 11, where each of the switchable permanent magnets comprise metal magnets.

15. The device according to claim 11, where the OFF state is achieved by application of a decaying sinusoidal current to the coil of the magnet being demagnetized.

16. The device according to claim 11, where the first and second ON states are achieved by application of a series of polarized pulses of current to the coil of the magnet being magnetized.

17. A magnetic holding device, comprising:
an array of a plurality of switchable permanent magnets;
a ferromagnetic carrier that holds the array of switchable permanent magnets;
each switchable permanent magnet in the array having a coil of wire surrounding a permanent magnet;
each of the switchable permanent magnets having sufficient coercivity level so as to be magnetized or demagnetized by application of a magnetizing or demagnetizing current to the coil;
the array arranged in at least first and second groups of alternating switchable permanent magnets on the ferromagnetic carrier, where each switchable permanent magnet in the first group has closest neighbor switchable permanent magnets that are in the second group, and where each switchable permanent magnet in the second group has closest neighbor switchable permanent magnets that are in the first group; and
a magnetizing and demagnetizing circuit coupled to the coils and configured to selectively carry out magnetizing and demagnetizing actions to put the switchable permanent magnets in the array into one of the following states:
a first ON state where all of the switchable permanent magnets in both the first group and the second group are magnetized to have the same magnetic polarity thereby establishing the array as an induced pole system with the ferromagnetic carrier serving as an induced pole,
a second ON state where the switchable permanent magnets in the first group are magnetized to have a polarity opposite a polarity to which the switchable permanent magnets in the second group are magnetized thereby establishing the array as a true pole system, and an OFF state where all of the switchable permanent magnets in both the first group and the second group are demagnetized.

18. The device according to claim 17, where each of the switchable permanent magnets comprise metal magnets.

19. The device according to claim 17, where the OFF state is achieved by application of a decaying sinusoidal current to the coil of the magnet being demagnetized.

20. The device according to claim 17, where the first and second ON states are achieved by application of a series of polarized pulses of current to the coil of the magnet being magnetized.

21. A magnetic holding device, comprising:
an array of a plurality of switchable permanent magnets;
a carrier that holds the array of switchable permanent magnets to form at least a portion of a working surface;
each switchable permanent magnet in the array having a coil of wire surrounding a magnetizable core element;
the array arranged in a plurality of at least first and second groups of one or more switchable permanent magnets in each group;
the array arranged in at least first and second groups of alternating switchable permanent magnets on the carrier, where each switchable permanent magnet in the first group has at least one closest neighbor switchable permanent magnet that is in the second group, and where each switchable permanent magnet in the second group has at least one closest neighbor switchable permanent magnet that is in the first group; and
a magnetizing and demagnetizing circuit coupled to the coils and configured to selectively carry out magnetizing and demagnetizing actions on each group of switchable permanent magnets so as to selectively and independently place each group of switchable permanent magnets in the array into a selected one of at least the following states:
a first ON state where all of the switchable permanent magnets in both the first group and the second group are magnetized to have the same magnetic polarity thereby establishing the array as an induced pole system with the ferromagnetic carrier serving as an induced pole,
a second ON state where the switchable permanent magnets in the first group are magnetized to have a polarity opposite a polarity to which the switchable permanent magnets in the second group are magnetized thereby establishing the array as a true pole system, and
an OFF state where all of the switchable permanent magnets in both the first group and the second group are demagnetized.

22. The magnetic holding device according to claim 21, where the magnetizing and demagnetizing circuit coupled to the coils is configured to selectively carry out magnetizing and demagnetizing actions on each of the switchable permanent magnets so as to selectively and independently place each group of switchable permanent magnets in the array into a selected one of the following states additional states:
a third ON state where the switchable permanent magnets in both the first group and the second group are magnetized to have the same magnetic polarity thereby establishing the array as an induced pole system with the ferromagnetic carrier serving as an induced pole, but in which at least one of the switchable permanent magnets is in the OFF state, and
a fourth ON state where the switchable permanent magnets in the first group are magnetized to have a polarity opposite a polarity to which the switchable permanent magnets in the second group are magnetized thereby establishing the array as a true pole system, but in which at least one of the switchable permanent magnets is in the OFF state.

23. The magnetic holding device according to claim 1, further comprising at least one permanent electromagnet that is in the OFF state when the first and second groups of magnets are in one of the first ON state or the second ON state.

24. The magnetic holding device according to claim 11, further comprising at least one permanent electromagnet that is in the OFF state when the first and second groups of magnets are in one of the first ON state or the second ON state.

* * * * *